(12) United States Patent
Lee et al.

(10) Patent No.: US 11,737,626 B2
(45) Date of Patent: Aug. 29, 2023

(54) CLEANING ROBOT AND METHOD FOR CONTROLLING THE SAME

(71) Applicant: SAMSUNG ELECTRONICS CO., LTD., Suwon-si (KR)

(72) Inventors: Dong Hun Lee, Ansan-si (KR); Heum Yong Park, Suwon-si (KR); Chang Yeong Kim, Seoul (KR); Jae Youl Jeong, Suwon-si (KR); Young Do Kwon, Yongin-si (KR); Jin Wook Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 470 days.

(21) Appl. No.: 17/101,430

(22) Filed: Nov. 23, 2020

(65) Prior Publication Data

US 2021/0068606 A1 Mar. 11, 2021

Related U.S. Application Data

(63) Continuation of application No. 15/550,670, filed as application No. PCT/KR2015/009660 on Sep. 15, 2015, now Pat. No. 10,874,277.

(30) Foreign Application Priority Data

Feb. 13, 2015 (KR) ........................ 10-2015-0022742

(51) Int. Cl.
*A47L 9/28* (2006.01)
*G05D 1/02* (2020.01)
(Continued)

(52) U.S. Cl.
CPC .............. *A47L 9/2863* (2013.01); *A47L 9/28* (2013.01); *A47L 9/2852* (2013.01); *B25J 9/16* (2013.01);
(Continued)

(58) Field of Classification Search
None
See application file for complete search history.

(56) References Cited

U.S. PATENT DOCUMENTS 2,575,020 A 11/1951 Lee et al.
6,809,490 B2 10/2004 Jones
(Continued)

FOREIGN PATENT DOCUMENTS

EP 2649920 10/2013
KR 10-1994-0013441 7/1994
(Continued)

OTHER PUBLICATIONS

International Search Report dated Dec. 9, 2015 in corresponding International Application No. PCT/KR2015/009660.
(Continued)

*Primary Examiner* — Lail A Kleinman
(74) *Attorney, Agent, or Firm* — STAAS & HALSEY LLP

(57) ABSTRACT

A cleaning robot having an improved structure capable of improving a user convenience and method for controlling the same are disclosed herein. A cleaning robot includes a main body to form an outer appearance and having an inlet port provided to suck a foreign matter present in a cleaning area, an operation unit detachably coupled to the main body and provided to be gripped, at least one motion sensor provided to detect a motion of the operation unit, and a control unit electrically connected to the at least one motion sensor to drive a driving motor of the main body based on the motion of the operation unit detected by the at least one motion sensor.

20 Claims, 29 Drawing Sheets

(51) Int. Cl.
*B25J 9/16* (2006.01)
*B25J 11/00* (2006.01)

(52) U.S. Cl.
CPC ............ *B25J 11/0085* (2013.01); *G05D 1/02* (2013.01); *G05D 1/021* (2013.01); *A47L 2201/00* (2013.01); *A47L 2201/04* (2013.01); *G05D 2201/0215* (2013.01); *Y10S 901/01* (2013.01)

(56) References Cited

U.S. PATENT DOCUMENTS

| | | | |
|---|---|---|---|
| 2005/0055792 | A1 | 3/2005 | Kisela |
| 2006/0047364 | A1 | 3/2006 | Tani |
| 2007/0094839 | A1* | 5/2007 | Zahuranec ................ A47L 5/32 15/328 |
| 2008/0063400 | A1 | 3/2008 | Hudson |
| 2008/0282494 | A1* | 11/2008 | Won ..................... G05D 1/0227 15/412 |
| 2008/0308643 | A1 | 12/2008 | Larson et al. |
| 2012/0189507 | A1 | 7/2012 | Ko |
| 2015/0059108 | A1 | 3/2015 | Smith |
| 2015/0174766 | A1* | 6/2015 | Jagenstedt ............. G06F 3/167 700/257 |
| 2016/0235268 | A1 | 8/2016 | Choi |

FOREIGN PATENT DOCUMENTS

| | | |
|---|---|---|
| KR | 20-0322350 | 8/2003 |
| KR | 20-0322350 Y1 | 8/2003 |
| KR | 10-2008-0017650 | 2/2008 |
| KR | 10-2011-0026414 | 3/2011 |
| KR | 10-2013-0096047 | 8/2013 |

OTHER PUBLICATIONS

Written Opinion of the International Searching Authority dated Dec. 9, 2015 in corresponding International Application No. PCT/KR2015/009660.
Extended European Search Report dated Apr. 16, 2018 in European Patent Application No. 15882133.0.
European Communication under Rule 71(3) dated Jan. 29, 2019 in European Patent Application No. 15882133.0.
Australian Office Action dated Oct. 24, 2019 in Australian Patent Application No. 2015382060.
U.S. Restriction Requirement dated Apr. 2, 2019 in U.S. Appl. No. 15/550,670.
U.S. Office Action dated Jun. 12, 2019 in U.S. Appl. No. 15/550,670.
U.S. Office Action dated Nov. 18, 2019 in U.S. Appl. No. 15/550,670.
U.S. Office Action dated Mar. 19, 2020 U.S. Appl. No. 15/550,670.
U.S. Notice of Allowance dated Aug. 24, 2020 in U.S. Appl. No. 15/550,670.
U.S. Appl. No. 15/550,670, filed Aug. 11, 2017, Dong Hun Lee.
Korean Office Action dated Jun. 27, 2021 in Korean Patent Application No. 10-2015-0022742.
Chinese Office Action dated Apr. 30, 2021 in Chinese Patent Application No. 201610197385.4.

\* cited by examiner

CLEANING ROBOT AND METHOD FOR CONTROLLING THE SAME

CROSS-REFERENCE TO RELATED APPLICATION

This application is a Continuation Application of U.S. patent application Ser. No. 15/550,670, filed on Aug. 11, 2017, which is a U.S. National Stage Application, which claims benefit under 35 U.S.C § 371 of International Patent Application No. PCT/KR2015/009660, filed Sep. 15, 2015, which claims the foreign priority benefit under 35 U.S.C. § 119 of Korean Patent Application No. 10-2015-0022742, filed Feb. 13, 2015, the contents of which are incorporated herein by reference.

TECHNICAL FIELD

Embodiments of the disclosure relate to a cleaning robot and method for controlling the same, and more particularly, to a cleaning robot having an improved structure capable of improving a user convenience and method for controlling the same.

BACKGROUND ART

A cleaning robot is a device that performs cleaning work by suctioning foreign matter such as dust from a floor while traveling a cleaning area by itself without user's operation. The cleaning robot identifies distances to obstacles such as furniture, office supplies, and walls installed in the cleaning area by using a distance sensor. And the cleaning robot selectively drives a left motor and a right motor, thereby cleaning the cleaning area while changing directions itself.

Recently, researches on the cleaning robot that performs the cleaning work based on an intention of a user are actively conducted. For an example, in a process of performing the cleaning work using the cleaning robot, there may be a case in which the cleaning work is manually performed by the user directly operating the cleaning robot. In order to perform the cleaning work manually using the cleaning robot, the user should lie down or sit to apply force to the cleaning robot. Therefore, the cleaning work is not easy.

DISCLOSURE

Technical Problem

It is an aspect of the disclosure to provide a cleaning robot and method for controlling the same, the cleaning robot having an improved structure for performing a cleaning work based on a user's intention.

It is another aspect of the disclosure to provide a cleaning robot and method for controlling the same, the cleaning robot having an improved structure so as to have both an automatic mode and a manual mode.

It is still another aspect of the disclosure to provide a cleaning robot and method for controlling the same, the cleaning robot having an improved structure to reduce a user's inconvenience that may be caused in a process in which a cleaning work is performed in a manual mode.

Technical Solution

In accordance with an aspect of the disclosure, a cleaning robot may include a main body to form an outer appearance and having an inlet port provided to suck a foreign matter present in a cleaning area, an operation unit detachably coupled to the main body and provided to be gripped, at least one motion sensor provided to detect a motion of the operation unit and a control unit electrically connected to the at least one motion sensor to drive a driving motor of the main body based on the motion of the operation unit detected by the at least one motion sensor.

In accordance with an aspect of the disclosure, the cleaning robot may further include an engagement sensor provided to detect whether the operation unit is coupled to the main body.

The at least one motion sensor may detect a tilted direction and a tilted degree of the operation unit with respect to an engagement extension line of the main body and the operation unit. The control unit may determine a traveling direction of the cleaning robot based on the tilted direction of the operation unit and determines a traveling speed of the cleaning robot based on the tilted degree of the operation unit.

The at least one motion sensor may include at least one of a pressure sensor, a flex sensor, an encoder sensor and a potentiometer.

The operation unit may be detachably coupled to a coupling unit provided in the main body. The coupling unit may include a first frame to which the operation unit is coupled and a second frame provided on the outer side of the first frame to be spaced apart from the first frame and provided with the at least one motion sensor.

The coupling unit may further include a connecting member positioned between the first frame and the second frame to connect the first frame and the second frame and formed of a material capable of being elastically deformed.

In accordance with an aspect of the disclosure, the cleaning robot may further include a driving wheel provided to move the main body and an obstruction sensor provided in the main body to detect an obstacle positioned in the cleaning area. The control unit may control the driving wheel so that when the obstruction sensor detects the obstacle, the cleaning robot returns to a position where the cleaning robot starts to travel, when a first automatic cleaning command is input.

In accordance with an aspect of the disclosure, the cleaning robot may further include a driving wheel provided to move the main body. The control unit may control the driving wheel so that the cleaning robot performs a repetitive cleaning operation for a predetermined section, when a second automatic cleaning command is input.

In accordance with an aspect of the disclosure, the cleaning robot may further include a driving wheel provided on the main body to move the main body in all directions.

The driving wheel may include an omni wheel.

In accordance with an aspect of the disclosure, the cleaning robot may further include a pad assembly which receives a rotational force from the driving motor and rotates in a clockwise or counterclockwise direction to clean the cleaning area.

In accordance with an aspect of the disclosure, a cleaning robot may include a main body provided with a driving unit for traveling, an operation unit detachably coupled to the main body and provided to be gripped and a control unit to block supply of power to the driving unit so as to move the main body using the operation unit, when the operation unit is coupled to the main body.

In accordance with an aspect of the disclosure, the cleaning robot may further include an engagement sensor provided to detect whether the operation unit is coupled to the main body.

The operation unit may be detachably coupled to a coupling unit provided in the main body. The engagement sensor may be provided in the coupling unit to be adjacent to the operation unit.

A magnet may be provided at one end of the operation unit coupled to the coupling unit. The engagement sensor may include a hall sensor which recognizes a magnetic field and detects whether the operation unit is coupled to the main body.

The engagement sensor may include a switch which recognizes a pressed degree by the operation unit and detects whether the operation unit is coupled to the main body.

The driving unit may include a driving wheel provided on the main body to move the main body and a driving motor connected to the driving wheel to drive the driving wheel. The control unit may prevent the driving motor from driving the driving wheel when the operation unit is coupled to the main body.

The driving unit may include a driving wheel to move the main body and provided to be insertable into the main body.

The control unit may control the driving wheel so that the driving wheel is inserted into the main body when the operation unit is coupled to the main body.

The driving unit may further include a caster provided on the main body so that the main body is movable in a stable posture. The main body may be moved by the caster when the operation unit is coupled to the main body.

An inlet port may be formed in the main body to suck a foreign matter present in a cleaning area.

In accordance with an aspect of the disclosure, a cleaning robot may include a main body, a cleaning module detachably coupled to the main body, an operation unit detachably coupled to the cleaning module and provided to be gripped and a locking device detachably coupling the cleaning module to the main body.

The locking device may be released such that the cleaning module is detached from the main body when the operation unit is coupled to the cleaning module.

The main body may be provided with a driving wheel. The cleaning module may be provided with at least one of an inlet port which sucks a foreign matter, a suction device to generate a suction force to suck a foreign matter, a dust collecting device to store the foreign matter introduced thought the inlet port, and a driving motor to transmit a driving force to the driving wheel.

In accordance with an aspect of the disclosure, a method for controlling a cleaning robot may include determining whether an operation unit is coupled to a main body and blocking a power supply to a driving unit when the operation unit is coupled to the main body.

In accordance with an aspect of the disclosure, the method may further include detecting a motion of the operation unit coupled to the main body by at least one motion sensor when the operation unit is coupled to the main body.

When a tilted direction of the operation unit is detected by the at least one motion sensor, a control unit may determine a traveling direction of the cleaning robot and drives the driving unit.

When a tilted degree of the operation unit is detected by the at least one motion sensor, a control unit may determine a traveling speed of the cleaning robot and drives the driving unit.

The at least one motion sensor may include at least one of a pressure sensor, a flex sensor, an encoder sensor and a potentiometer.

Advantageous Effects

Since an automatic mode and a manual mode of a cleaning robot are capable to be selected depending on whether an operation unit is coupled to a main body or not, a user convenience in selecting a cleaning mode may be improved.

A cleaning operation of the cleaning robot in which a user's intention is reflected may be expected by applying the manual mode, in which the user is able to perform a cleaning work while moving the main body manually, to a general cleaning robot.

By using the cleaning robot having an AMC mode, the cleaning work may be performed while easily moving the main body with a small force.

Since the user is able to perform the cleaning work by gripping an operation unit in his standing state in the manual mode of the cleaning robot, a posture inconvenience that may be caused in moving the cleaning robot may be minimized.

DESCRIPTION OF DRAWINGS

These and/or other aspects of the disclosure will become apparent and more readily appreciated from the following description of the embodiments, taken in conjunction with the accompanying drawings of which.

MODE FOR INVENTION

Figure 1:
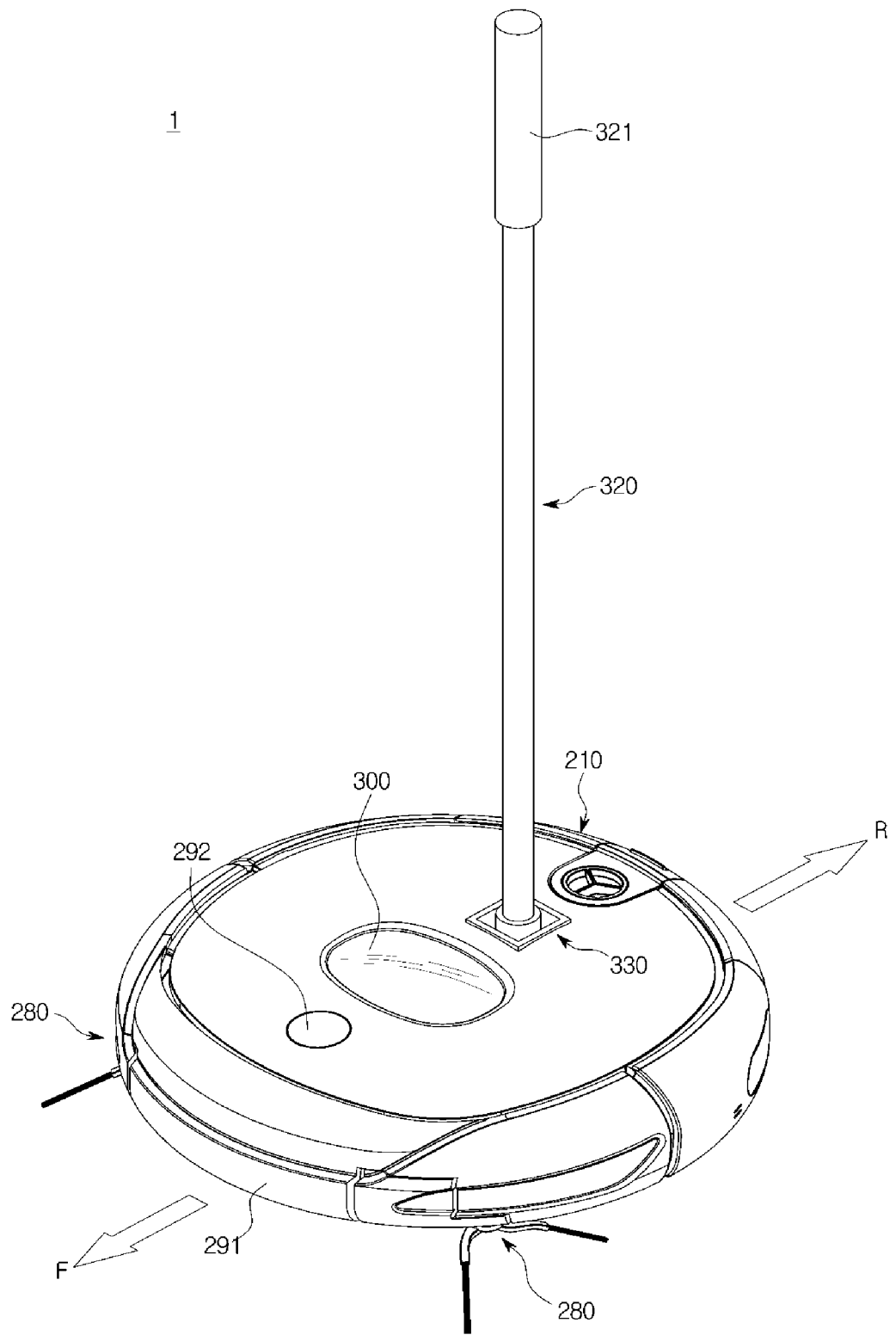
FIG. 1 is a perspective view illustrating an outer appearance of a cleaning robot in accordance with a first embodiment of the disclosure.

Hereinafter, the preferred embodiments of the present disclosure will be described in detail with reference to the accompanying drawings. In the drawings, like reference numerals refer to like elements throughout. Meanwhile, terms, "front end", "rear end", "upper", "lower", "upper end" and "lower end" which will be used in the below description are defined based on the drawings, and the shapes and positions of elements are not limited by the terms.

A cleaning robot may mean a robot which has a cleaning function. In addition, the cleaning robot may be used to move objects, communicate with people, communicate with terminals, and operate home appliances. Further, the cleaning robot may have a function of controlling a power of houses. For an example, the home appliances may include a refrigerator, a washing machine, a dryer, a lighting, an air conditioner, a cooking device, etc.

Generally, the cleaning robot may travel a cleaning area by itself without user's operation and suck a foreign matter such as dust to perform cleaning work. In this manner, the cleaning robot automatically cleaning the cleaning area may be referred to as "an automatic mode".

On the other hand, it may be referred to as "a manual mode" that the user manually cleans the cleaning area by using the cleaning robot. In the manual mode, the cleaning robot may not travel by a driving force transmitted from a driving unit but by an external force applied by the user. In the manual mode, only a traveling function of the cleaning robot may be limited, and a cleaning function of the cleaning robot may be the same as that of a general cleaning robot, that is, the cleaning robot in the automatic mode.

The cleaning robot may include "an advanced motion control (AMC) mode". When the cleaning robot is used in the manual mode, a movement of the cleaning robot may only depend on the external force of the user. Therefore, the user may have to take many inconveniences when cleaning in the manual mode. Thus, it may be the AMC mode to alleviate the inconveniences that the user may have to take in the manual mode. The user may easily move the cleaning robot with a small force using a motion sensor in the AMC mode.

The automatic mode, the manual mode and the AMC mode may be mutually switched by the user's input.

Figure 2:
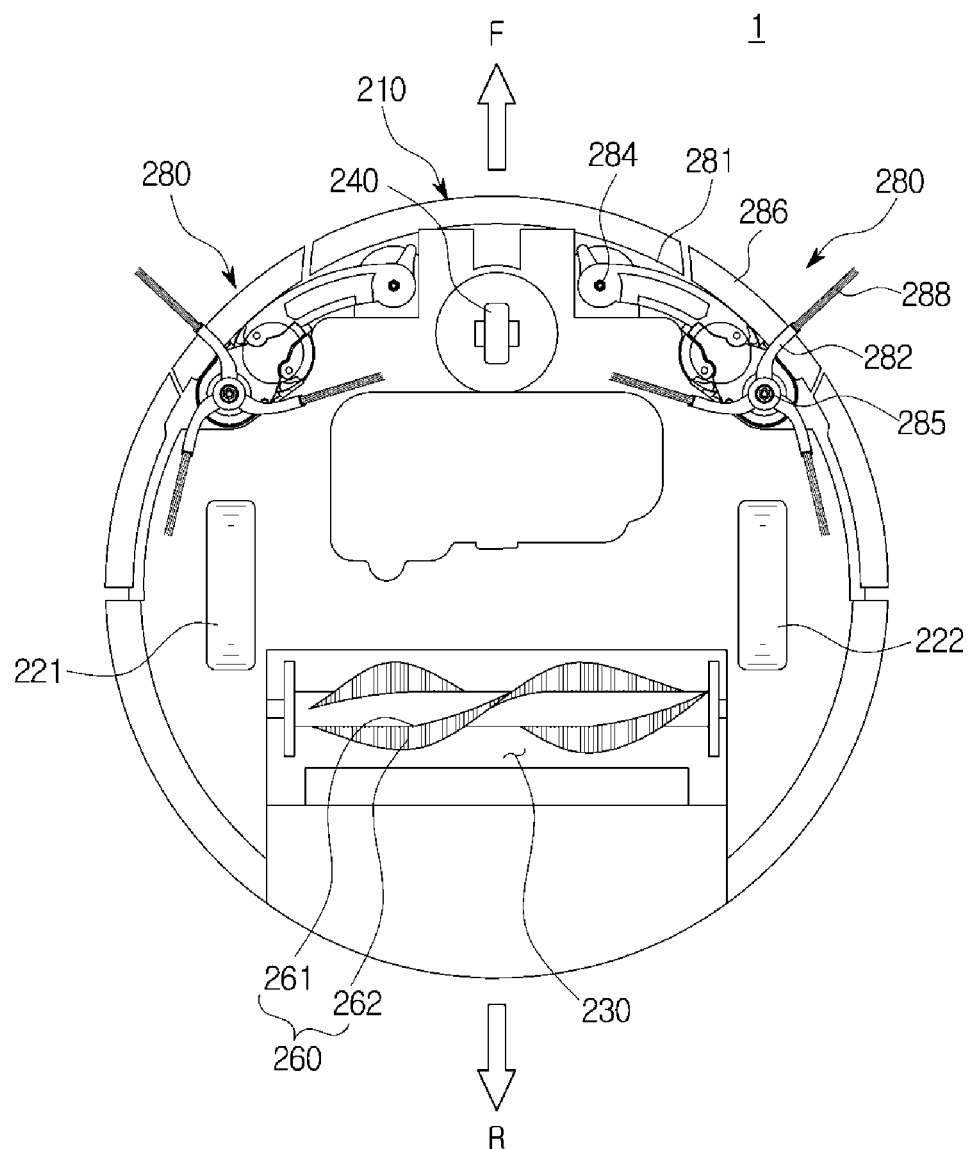
FIG. 2 is a rear view illustrating a lower structure of the cleaning robot in accordance with the first embodiment of the disclosure.

FIG. 1 is a perspective view illustrating an outer appearance of a cleaning robot in accordance with a first embodiment of the disclosure, and FIG. 2 is a rear view illustrating a lower structure of the cleaning robot in accordance with the first embodiment of the disclosure. Hereinafter, a sensor 290 may be used in the same meaning as an obstruction sensor.

As shown in FIGS. 1 and 2, the cleaning robot 1 may include a main body 210 which forms an outer appearance. An inlet port 230 may be formed in the main body 210 to suck the foreign matter such as dust present in the cleaning area.

The cleaning robot 1 may further include a driving unit provided in the main body 210 so as that the main body 210 is able to travel.

The driving unit may include a plurality of driving wheels 221 and 222 provided to the main body 210 to move the main body 210. Further, the driving unit may include the plurality of driving wheels 221 and 222 provided to the main body 210 to move the main body 210 in all directions. The driving wheels 221 and 222 which are capable to move the main body 210 in all directions may include an omni wheel.

The driving unit may further include a driving motor (not shown) which generates a driving force to drive the driving wheels 221 and 222. The driving motor may be connected to the driving wheels 221 and 222 so as to drive the driving wheels 221 and 222.

As will be described later, the driving motor may not generate the driving force to drive the driving wheels 221 and 222 in the manual mode. That is, the driving wheels 221 and 222 may be driven by the external force applied by the user instead of the driving motor in the manual mode.

Two driving wheels 221 and 222 may be symmetrically disposed on the left and right edges of the central region of the lower portion of the main body 210. The driving wheels 221 and 222 may allow the cleaning robot 1 to move forward, to move backward and to rotate in the course of performing cleaning.

The driving unit may further include a caster 240 provided to the main body 210 so that the main body 210 is able to move in a stable posture. Specifically, the caster 240 may change a rotating angle depending on a condition of a floor on which the cleaning robot 1 moves thereby allowing the main body 210 to maintain the stable posture. The caster 240 may be installed on the front edge of the lower portion of the main body 210 with respect to a traveling direction of the cleaning robot 1. The driving wheels 221 and 222 and the caster 240 may be constituted as one assembly and detachably mounted on the main body 210.

The cleaning robot 1 may further include a power supply unit 250 which supplies a driving power for driving the main body 210. The power supply unit 250 may include a battery electrically connected to each of the driving unit for driving the main body 210 and a driving unit for driving electronic equipment mounted the main body 210. The battery may be provided to supply the driving power to both driving units. (나눠서 번역하였습니다.) The battery may include a rechargeable secondary battery. The battery may be charged by receiving power from a docking station (not shown) when the main body 210 completes the cleaning work and is coupled to the docking station.

The cleaning robot 1 may further include a main brush unit 260 which guides the foreign matter such as dust present on the floor to the inlet port 230. The main brush unit 260 may be mounted on the inlet port 230 formed in a portion rearward (R) in the central region of the lower portion of the main body 210. The main brush unit 260 may remove the foreign matter such as dust accumulated on the floor where the main body 210 is placed. The main brush unit 260 may include a roller 261 and a main brush 262 engaged to the outer surface of the roller 261. As roller 261 rotates, the main brush 262 may stir the foreign matter such as dust accumulated on the floor and guide the foreign matter to the inlet port 230. The roller 261 may be formed of a rigid body, but may be not limited thereto. The main brush 262 may be formed of various materials having elasticity.

The cleaning robot 1 may further include a blowing unit (not shown) provided inside the inlet port 230 to generate a suction force. The foreign matter such as dust which has flowed into the inlet port 230 may be moved to a dust collecting device 270 by the blowing unit (not shown).

The cleaning robot 1 may further include a side brush unit 280 for cleaning an adjacent portion of a wall and a corner portion. The side brush unit 280 will be described later in detail.

The cleaning robot 1 may further include the sensor 290. The sensor 290 may be mounted to the main body 210 to sense the surrounding environment of the cleaning robot 1. The sensor 290 may include at least one of a proximity sensor 291 and a vision sensor 292. For example, when the cleaning robot 1 travels in an arbitrary direction without a predetermined route, the cleaning robot 1 may travel in the cleaning area by using the proximity sensor 291. That is, in a cleaning system without a map, the cleaning robot 1 may travel in the cleaning area by using the proximity sensor 291. Conversely, when the cleaning robot 1 travels along a predetermined route, that is, in the cleaning system requiring the map, the vision sensor 292 for receiving positional information of the cleaning robot 1 and making the map may be installed. The sensor 290 may be not limited to the above example, and may be implemented in various ways.

The cleaning robot 1 may further include a display unit 300. The display unit 300 may display various states of the cleaning robot 1. For example, the display unit 300 may display whether the battery is charged or not, whether the foreign matter such as dust is filled in the dust collecting device 270 or not, whether the cleaning robot 1 is in a cleaning mode or not, and whether the cleaning robot 1 is in a sleeping mode or not.

The cleaning robot 1 may further include an input unit 310. The cleaning robot 1 may receive a traveling performance command, a cleaning performance command, or a power on/off command from the user through the input unit 310.

The cleaning robot 1 may further include an operation unit 320 to perform the cleaning work in accordance with the user's intention. The operation unit 320 may be provided with a handle 321 for the user to grip. Details of the operation unit 320 will be described later.

Figure 3:
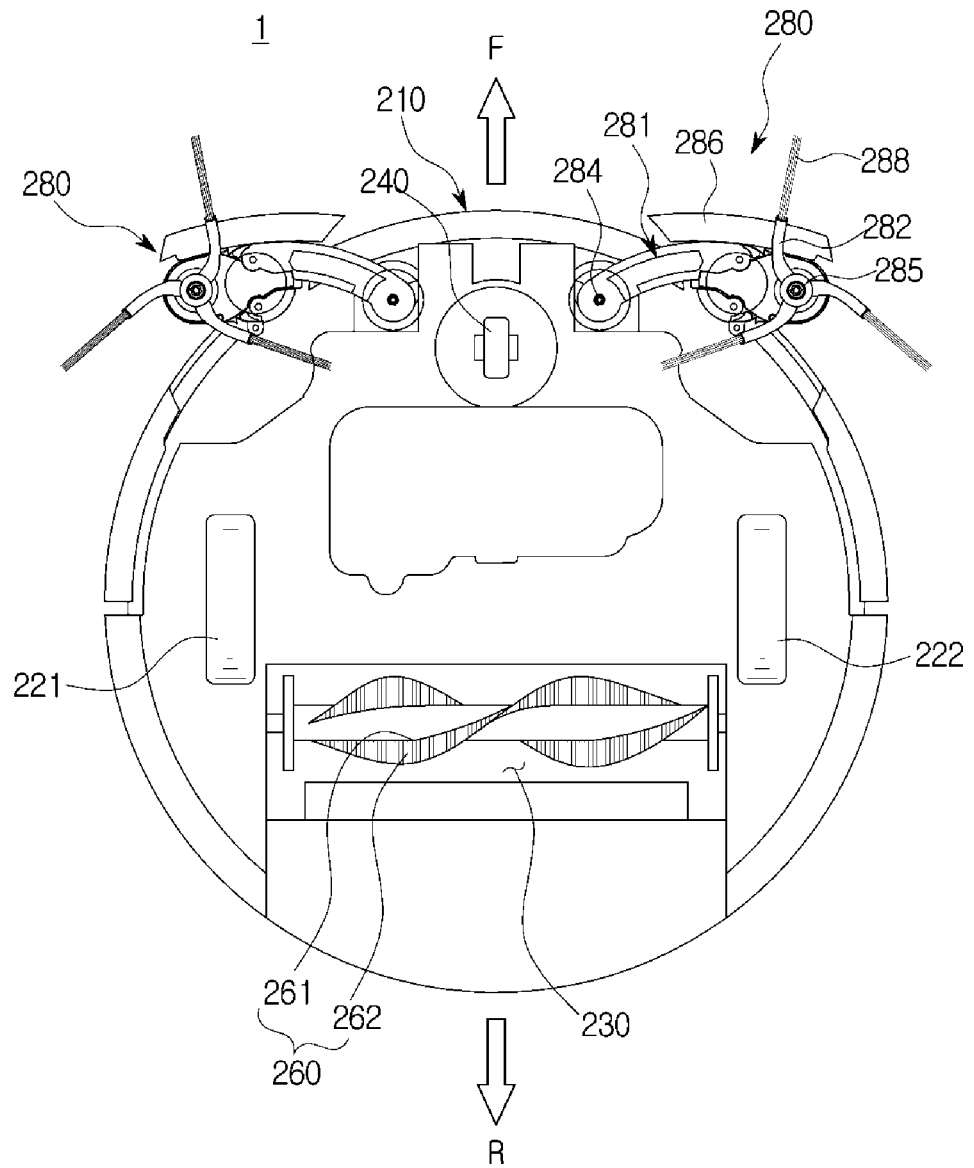
FIG. 3 is a rear view illustrating a state in which a side brush unit of the cleaning robot in accordance with the first embodiment of the disclosure protrudes to the outside.

FIG. 3 is a rear view illustrating a state in which a side brush unit of the cleaning robot in accordance with the first embodiment of the disclosure protrudes to the outside. Hereinafter, reference numerals not denoted in FIG. 3 will be able to be understood from the above description with reference to FIGS. 1 and 2. FIG. 2 shows a state in which the side brush unit 280 of the cleaning robot 1 is in a contracted state. Hereinafter, the protruding and contracted operation of the side brush unit 280 will be described in FIGS. 2 and 3. (나눠서 번역.)

The side brush unit 280 may include a side arm 281, a brush arm 282 rotatably mounted at one end of the side arm 281, a side brush 283, etc.

A support (not shown) may be provided on one side of the front portion (F) of the main body 210. An arm motor housing (not shown) may be coupled to the upper portion of the support, and the side arm 281 may be coupled to the lower portion of the support.

An arm motor (not shown) may be accommodated in the main body 210. The arm motor may be connected to a rotation shaft (not shown) through a predetermined gear that transmits the driving force to the side arm 281. The rotation shaft may be mounted in a coupling groove 284 formed at one end of the side arm 281. When the arm motor is driven, the side arm 281 may rotate with respect to the coupling groove 284 as the rotation shaft rotates.

A brush motor (not shown) may be accommodated in the side arm 281. The brush motor may be connected to a rotation shaft (not shown) through a predetermined gear that transmits the driving force to the brush arm 282. The rotation shaft may be connected to a rotation unit 285. With this configuration, when the brush motor is driven, the rotation unit 285 may be rotated by the driving force.

The brush arm 282 may be formed to extend radially outward from the rotation unit 285. The brush arm 282 may be rotated by a rotation of the rotation unit 285. The side brush 283 coupled to the brush arm 282 may clean the foreign matter such as dust present on the floor and collect the foreign matter in the center portion of the main body 210. (의역 하였습니다.)

An edge cover 286 may be mounted on the outside of the side arm 281. The edge cover 286 may cover an opening formed to the main body 210 and form a part of the side edge of the main body 210 by itself.

When the arm motor rotates, the driving force may be transmitted to the side arm 281 via the gear (not shown), and the side arm 281 may rotate to the outside of the main body 210.

When the side arm 281 rotates, the edge cover 286 may no longer cover the opening of the main body 210 and may not form the side edge of the main body 210.

Since the side arm 281 rotates with respect to the coupling groove 284, the brush arm 282, which is mounted on the opposite end of the portion where the coupling groove 284 is provided, and the side brush 283 may protrude outward of main body 210.

Since the side brush unit 280 protruding outward of the main body 210 widens the cleaning area, a bottom corner and an adjacent part of the wall may be cleaned.

Figure 4:
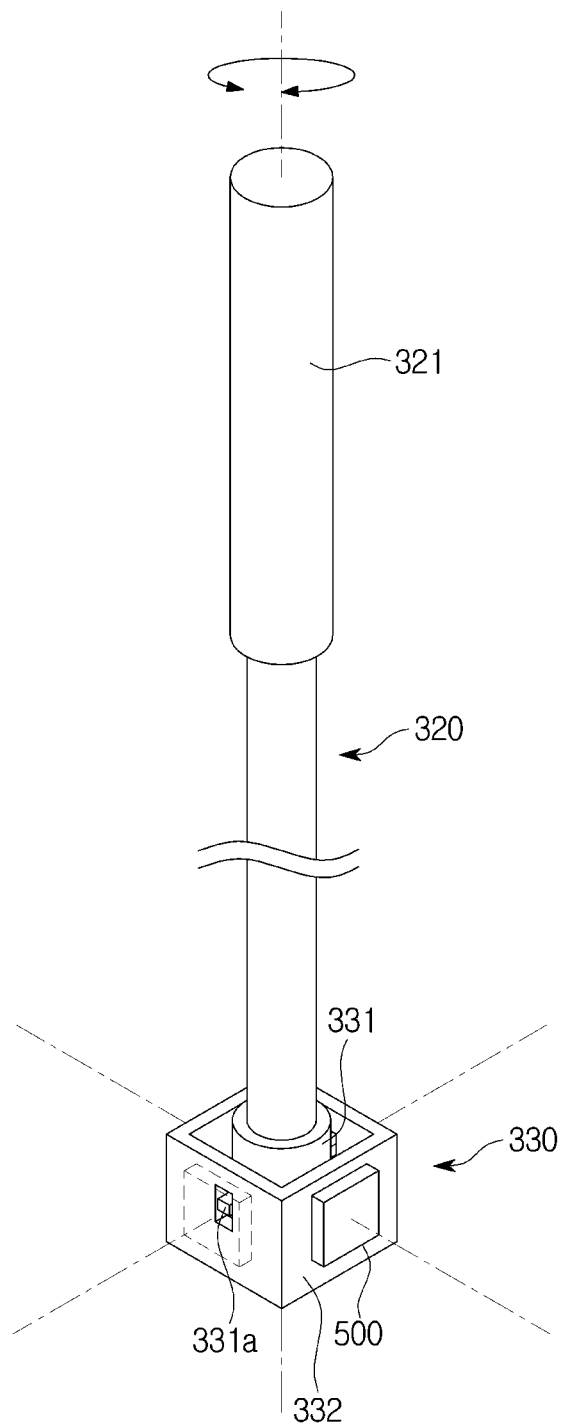
FIG. 4 is an enlarged perspective view illustrating an operation unit of the cleaning robot in accordance with the first embodiment of the disclosure.
Figure 5:
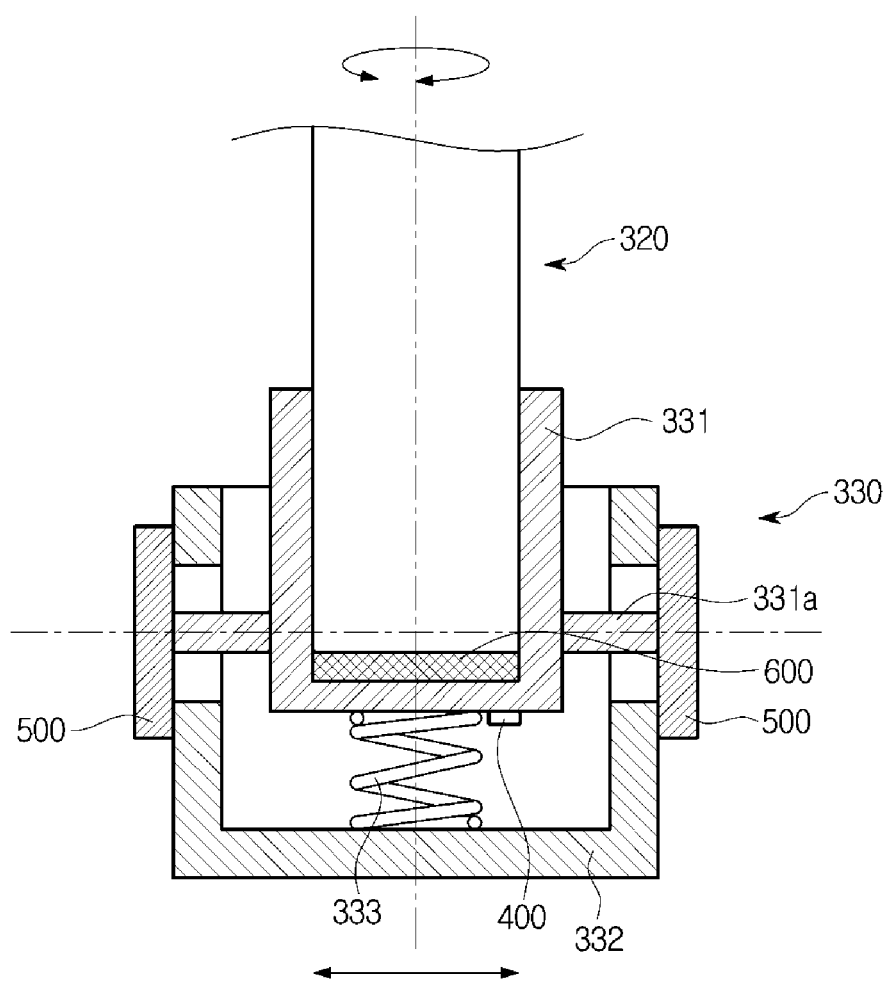
FIG. 5 is a cross-sectional view illustrating a coupling structure of the operation unit and the main body of the cleaning robot in accordance with the first embodiment of the disclosure.

FIG. 4 is an enlarged perspective view illustrating an operation unit of the cleaning robot in accordance with the first embodiment of the disclosure, and FIG. 5 is a cross-sectional view illustrating a coupling structure of the operation unit and the main body of the cleaning robot in accordance with the first embodiment of the disclosure. Hereinafter, reference numerals not denoted in FIGS. 4 and 5 will be able to be understood from the above description with reference to FIGS. 1 to 3.

As shown in FIGS. 4 and 5, the cleaning robot 1 may further include the operation unit 320 detachably coupled to the main body 210 and provided to be gripped.

The cleaning robot 1 may further include a coupling unit 330 provided on the main body 210 so that the operation unit 320 is detachably coupled.

The coupling unit 330 may include a first frame 331 to which the operation unit 320 is coupled. The operation unit 320 may be detachably coupled to the inside of the first frame 331.

The coupling unit 330 may further include a second frame 332 provided outside the first frame 331 to be spaced apart from the first frame 331. The second frame 332 may accommodate the first frame 331 internally to be spaced apart from each other.

The coupling unit 330 may further include a connecting member 333 positioned between the first frame 331 and the second frame 332 to connect the first frame 331 and the second frame 332. The connecting member 333 may be formed of a material capable of being elastically deformed. For example, the connecting member 333 may include a spring.

The second frame 332 may be fixed to the main body 210. The first frame 331 may be connected to the second frame 332 by the connecting member 333 so as to be movable within the second frame 332 together with the operation unit 320.

The cleaning robot 1 may further include an engagement sensor 400 provided to detect whether the operation unit 320 is coupled to the main body 210. Specifically, the engagement sensor 400 may be provided to detect whether the operation unit 320 is coupled to the first frame 331 of the coupling unit 330. The engagement sensor 400 may be provided to the coupling unit 330 so as to be adjacent to the operation unit 320. Specifically, the engagement sensor 400 may be installed on the inner wall or the outer wall of the first frame 331 so as to be adjacent to the operation unit 320 coupled to the first frame 331.

The engagement sensor 400 may include at least one of a hall sensor and a switch. It is sufficient that the engagement sensor 400 is capable of detecting whether or not the operation unit 320 is coupled to the main body 210 and a type of the engagement sensor 400 is not limited to at least one of the hall sensor and the switch.

FIG. 5 shows a case in which the hall sensor is used as an example of the engagement sensor 400. The hall sensor recognizes a magnetic field and detects whether the operation unit 320 is coupled to the main body 210, that is, whether the operation unit 320 is coupled to the first frame 331. In FIG. 5, the hall sensor is installed on the outer wall of the first frame 331. However, as described above, the hall sensor may be installed on the inner wall of the first frame 331 so as to face the operation unit 320. A magnet 600 may be provided at one end of the operation unit 320 coupled to the engagement unit 330. That is, at one end of the operation unit 320 coupled to the first frame 331, the magnet 600 may be provided to interact with the hall sensor.

When the switch is used as the engagement sensor 400, the switch may recognize whether the operation unit 320 is pressed by the operation unit 320 and detect whether the operation unit 320 is coupled to the main body 210. In other words, the switch may detect whether the operation unit 320 is coupled to the first frame 331. (나눠서 번역) It is preferable that the switch is installed on the inner wall of the first frame 331 so that the switch is able to be pressed by the operation unit 320 coupled to the first frame 331. However, an installation position of the switch is not limited to the inner wall of the first frame 331. When the switch is used as the engagement sensor 400, the magnet 600 provided at one end of the operation unit 320 may be omitted.

The cleaning robot 1 may further include at least one motion sensor 500 provided to detect the movement of the operation unit 320 coupled to the main body 210. As will be described later, the at least one motion sensor 500 may be used to execute the AMC mode of the cleaning robot 1.

The at least one motion sensor 500 may be provided at the second frame 332 to detect the movement of the operation unit 320 coupled to the first frame 331.

The at least one motion sensor 500 may detect a tilted direction and a tilted degree of the operation unit 320 with respect to a virtual engagement extension line L (hereinafter, an engagement extension line L) extending along a coupling direction of the operation unit 320 with respect to the main body 210. As will be described later, the tilted direction of the operation unit 320 with respect to the engagement extension line L may determine a travel direction of the cleaning robot 1 in AMC mode, and the tilted degree of the operation unit 320 with respect to the engagement extension line L may determine a travel speed of the cleaning robot 1 in the AMC mode.

The at least one motion sensor 500 may include at least one of a pressure sensor, a flex sensor, an encoder sensor and a potentiometer.

FIGS. 4 and 5 show a case in which the pressure sensor is used as one example of the at least one motion sensor 500. The pressure sensor may recognize a pressure applied to the pressure sensor and detect to which direction the operation unit 320 tilts with respect to the engagement extension line L and how much the operation unit 320 tilts. The case in which the pressure sensor is used as the at least one motion sensor 500 will be described in FIGS. 4 and 5. The first frame 331 may be provided with a plurality of pressing portions 331a protruding toward the second frame 332. The second frame 332 may be provided with a plurality of pressure sensors for interacting with the plurality of pressing portions 331a. For one example, the plurality of pressing portions 331a may include a first pressing portion protruding toward the right side of the engagement extension line L with respect to the front F of the cleaning robot 1 to which the side arm 281 is coupled so as to detect the movement of the operation unit 320. The plurality of pressing portions 331a may further include a second pressing portion protruding toward the left side of the engagement extension line L with respect to the front F of the cleaning robot 1. The plurality of pressing portions 331a may further include a third pressing portion protruding toward the front direction of the engagement extension line L. The plurality of pressing portions 331a may further include a fourth pressing portion protruding toward the rear direction of the engagement extension line L. (나눠서 번역함) The plurality of pressure sensors may include a first pressure sensor provided to the second frame 332 so as to be able to interact with the first pressing portion, a second pressure sensor provided to the second frame 332 so as to be able to interact with the second pressing portion, a third pressure sensor provided to the second frame 332 so as to be able to interact with the third pressing portion and a fourth pressure sensor provided to the second frame 332 so as to be able to interact with the fourth pressing portion. For one example, when the operation unit 320 is tilted toward the right side of the engagement extension line L with respect to the front F of the cleaning robot 1 to which the side arm 281 is coupled, the first pressing portion may press the first pressure sensor. And then the at least one motion sensor 500 may detect that the operation unit 320 is tilted to the right side of the engagement extension line L. When the operation unit 320 is more tilted toward the right side of the engagement extension line L with respect to the front F of the cleaning robot 1 to which the side arm 281 is coupled, the first pressing portion may strongly press the first pressure sensor. And then the at least one motion sensor 500 may detect that the operation unit 320 is more tilted to the right side of the engagement extension line L. A configuration of the at least one motion sensor 500 is not limited to the above example, and may be variously modified.

FIG. 6 is a view illustrating various structures of the operation unit applicable to the cleaning robot in accordance with the first embodiment of the disclosure.

As shown in FIG. 6, the cleaning robot 1 may include the operation unit 320 having various shapes.

Figure 6A:
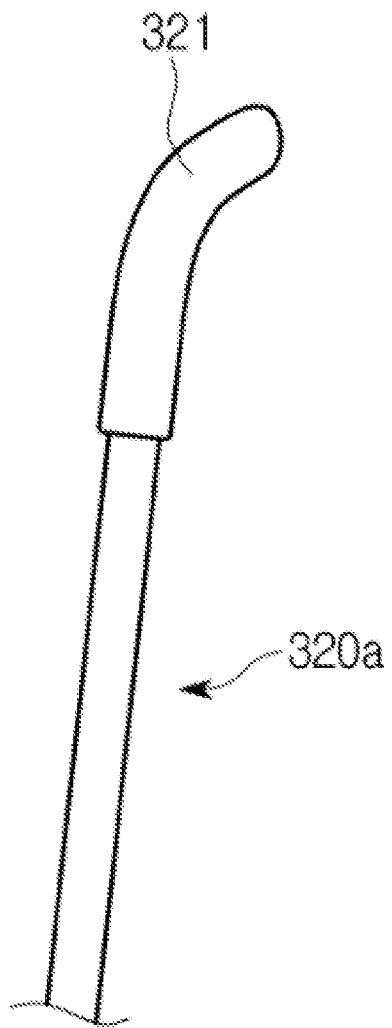
FIGS. 6a, 6b and 6c are views illustrating various structures of the operation unit applicable to the cleaning robot in accordance with the first embodiment of the disclosure.

As shown in FIG. 6A, the cleaning robot 1 may include an operation unit 320a having the smoothly curved handle 321.

Figure 6B:
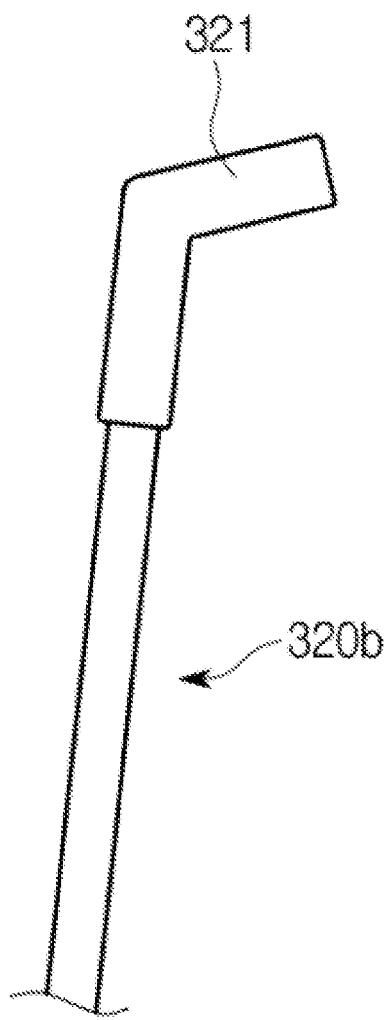

As shown in FIG. 6B, the cleaning robot 1 may include an operation unit 320b having the handle 321 which has a bent shape such as "⌠".

Figure 6C:
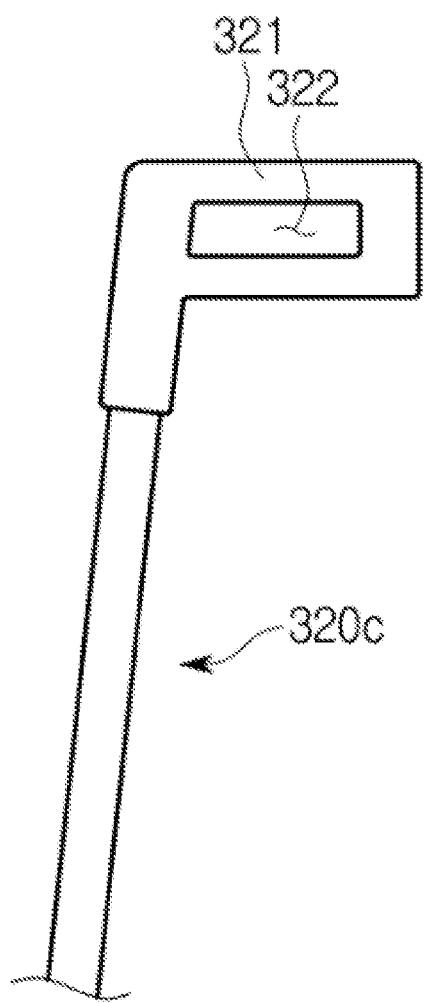

As shown in FIG. 6C, the cleaning robot 1 may include an operation unit 320c having the handle 321 which has a hole 322 formed therein. A portion of the user's hand may be inserted into the hole 322 so that the user is able to stably grip the handle 321.

The handle 321 may be provided with various operation buttons (not shown) as an example of an input unit capable of receiving commands such as the traveling performance command, the cleaning performance command, or the power on/off command from the user.

Figure 7:
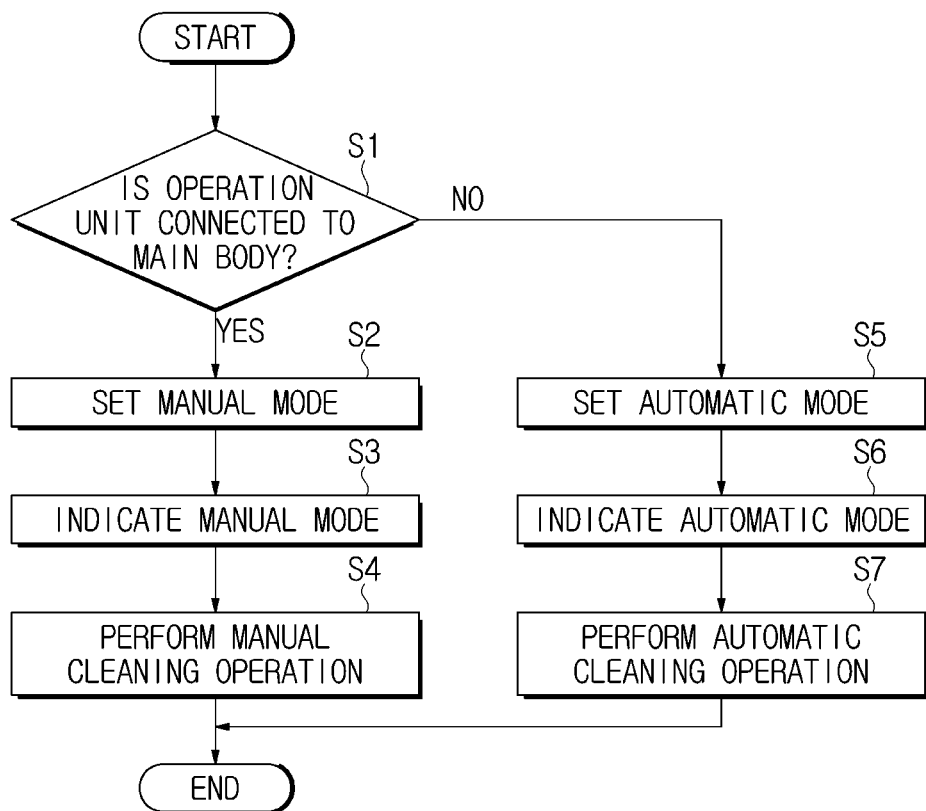
FIG. 7 is a flowchart showing an operation of the cleaning robot having an automatic mode and a manual mode in the cleaning robot in accordance with the first embodiment of the disclosure.

FIG. 7 is a flowchart showing an operation of the cleaning robot having an automatic mode and a manual mode in the cleaning robot in accordance with the first embodiment of the disclosure. Hereinafter, reference numerals not denoted in FIG. 7 will be able to be understood from the above description with reference to FIGS. 1 to 5.

As shown in FIG. 7, the cleaning robot 1 may be set to the automatic mode or the manual mode depending on whether or not the operation unit 320 is coupled to the man body 320 (S1). Whether or not the operation unit 320 is coupled to the main body 210 may be detected by the engagement sensor 400. The information detected by the engagement sensor 400 may be transmitted to a controller 700.

When it is detected by the engagement sensor 400 that the operation unit 320 is coupled to the main body 210, the controller 700 may set the manual mode so that the user is able to directly operate the cleaning robot 1 and clean. When the cleaning robot 1 is set to the manual mode, the controller 700 may display the manual mode on the display unit 300 (S3). When the manual mode is displayed on the display unit 300, the cleaning robot 1 may perform a manual cleaning work based on the external force applied by the user (S4).

In other words, in the manual mode, a method for controlling the cleaning robot 1 may include determining whether the operation unit 320 is coupled to the main body 210 (H1). The method for controlling the cleaning robot 1 may further include blocking the power supply to the driving unit when the operation unit 320 is coupled to the main body 210 (H2).

When it is not detected that the operation unit 320 is coupled to the main body 210 by the engagement sensor 400, the controller 700 may set the automatic mode so that the cleaning robot 1 is able to automatically clean the cleaning area (S5). When the automatic mode is set, the controller 700 may allow the display unit 300 to display the automatic mode thereon (S6). When the automatic mode is displayed on the display unit 300, the cleaning robot 1 may clean by itself while traveling in the cleaning area (S7).

Figure 8:
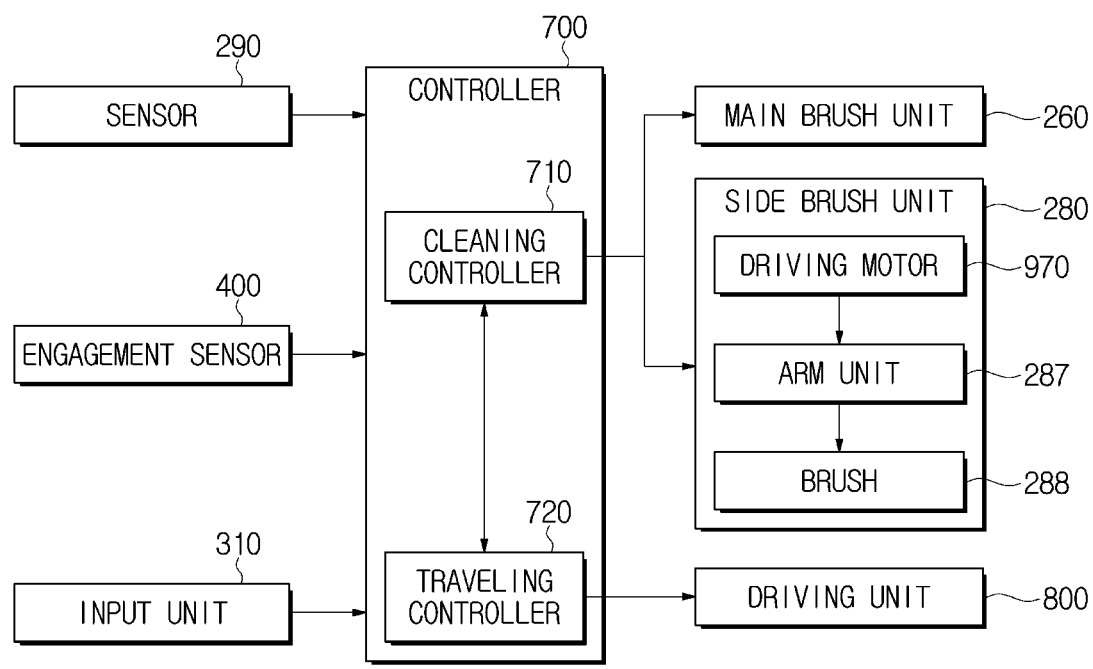
FIG. 8 is a control block diagram showing the automatic mode of the cleaning robot in accordance with the first embodiment of the disclosure.

FIG. 8 is a control block diagram showing the automatic mode of the cleaning robot in accordance with the first embodiment of the disclosure. Hereinafter, reference numerals not denoted in FIG. 8 will be able to be understood from the above description with reference to FIGS. 1 to 5 and 7.

As shown in FIG. 8, the cleaning robot 1 may include the sensor 290 to sense the obstacle in the cleaning area, the engagement sensor 400 to detect whether the operation unit 320 is coupled to the main body 210, the input unit 310 to receive the travel performance command or the cleaning performance command from the user, the controller 700 to control traveling and cleaning operation of the cleaning robot 1 based on a detection result of the sensor 290 and the engagement sensor 400 or the command input to the input unit 310, the main brush unit 260 and the side brush unit 280 which perform the cleaning operation of the cleaning robot 1, and a driving unit 800 in charge of traveling of the cleaning robot 1.

The sensor 290 may sense the obstacle that is approaching while the cleaning robot 1 is moving. The sensor 290 may be implemented by at least one of an ultrasonic sensor, an optical sensor and a proximity sensor. The sensor 290 implemented by the ultrasonic sensor may transmit ultrasonic waves to a traveling path, receive the reflected ultrasonic waves and sense the obstacle. In the case of the sensor 290 implemented by the optical sensor, the infrared emitting element may emit infrared rays and the infrared receiving element may receive the reflected infrared rays to detect the obstacle. A proximity sensor, a contact sensor, etc. may be also used as the sensor 290, and any configuration capable of detecting the obstacle is not limited.

The engagement sensor 400 may detect whether or not the operation unit 320 is coupled to the main body 210. The engagement sensor 400 may include the at least one of the hall sensor and the switch. The detailed description of the engagement sensor 400 has already been described in FIGS. 4 and 5, and therefore will be omitted.

The input unit 310 may receive the cleaning performance command or the travel performance command of the cleaning robot 1 from the user. Basically, a cleaning start command or a cleaning end command may be inputted through an on/off input, and a command for a traveling mode and a cleaning mode may be inputted. The input unit 310 may be implemented in the main body 210 of the cleaning robot 1 in a button manner. Also, the input unit 310 may be implemented on the display unit 300 of the cleaning robot 1 in a touch panel manner. In addition, the input unit 310 may be implemented by a button manner or a touch panel manner on the handle 321 of the operation unit 320.

The cleaning robot 1 may further include the controller 700. The controller 700 may control the entire operation of the cleaning robot 1.

The controller 700 may execute the automatic mode or the manual mode of the cleaning robot 1 based on the detection result of the engagement sensor 400. When the engagement sensor 400 detects that the operation unit 320 is not coupled to the main body 210, the controller 700 may execute the automatic mode so that the cleaning robot 1 cleans the cleaning area while traveling by itself.

The controller 700 may include a cleaning controller 710 to control the cleaning operation and a traveling controller 720 to control the traveling operation.

The cleaning controller 710 may control the main brush unit 260 and the side brush unit 280 based on the detecting result of the sensor 290 or an user's command inputted thorough the input unit 310 according to the set cleaning mode.

The traveling controller 720 may also control the driving unit 800 based on the detecting result of the sensor 290 or the user's command inputted through the input unit 310 to control the traveling direction and the traveling speed of the cleaning robot 1.

The main brush unit 260 may include the roller 261 and the main brush 262 that is embedded in the outer surface of the roller 261 as described above. As the roller 261 rotates, the main brush 262 may stir the dust accumulated in the cleaning area and guide the dust to the inlet port 230 to perform a main cleaning operation. When the cleaning controller 710 sends a control signal to the driving motor which drives the roller 261, the main brush 262 may perform the cleaning operation according to the control signal.

The side brush unit 280 may perform cleaning of the corner portion which is hard to be cleaned by the main brush unit 260. The side brush unit 280 may include an arm unit 287, a driving motor 970, and a brush 288. The arm unit 287 may include various arms such as the side arm 281 for carrying out the protruding and retracting operation of the side brush unit 280 and a brush arm 282 for rotating the side brush unit 280. The driving motor 970 may drive the side arm 281, the brush arm 282, and the like. The brush 288 may scatter or sweep away the foreign matter such as dust.

The driving unit 800 may include the plurality of driving wheels 221 and 222, the caster 240 and the driving motor 970 for driving the plurality of driving wheels 221 and 222 and the caster 240. When the traveling controller 720 sends the control signal to the driving motor 970, It may be possible to move the cleaning robot 1 forward (F) or rearward (R) by driving the plurality of driving wheels 221 and 222 forward (F) or rearward (R). Meanwhile, while the left driving wheel 221 is moved rearwardly, the right driving wheel 222 is driven forward (F) so that the cleaning robot 1 rotates leftward with respect to the forward direction (F). While the left driving wheel 221 is moved forwardly, the right driving wheel 222 is driven rearward (R) so that the cleaning robot 1 rotates rightward with respect to the forward direction (F).

Figure 9:
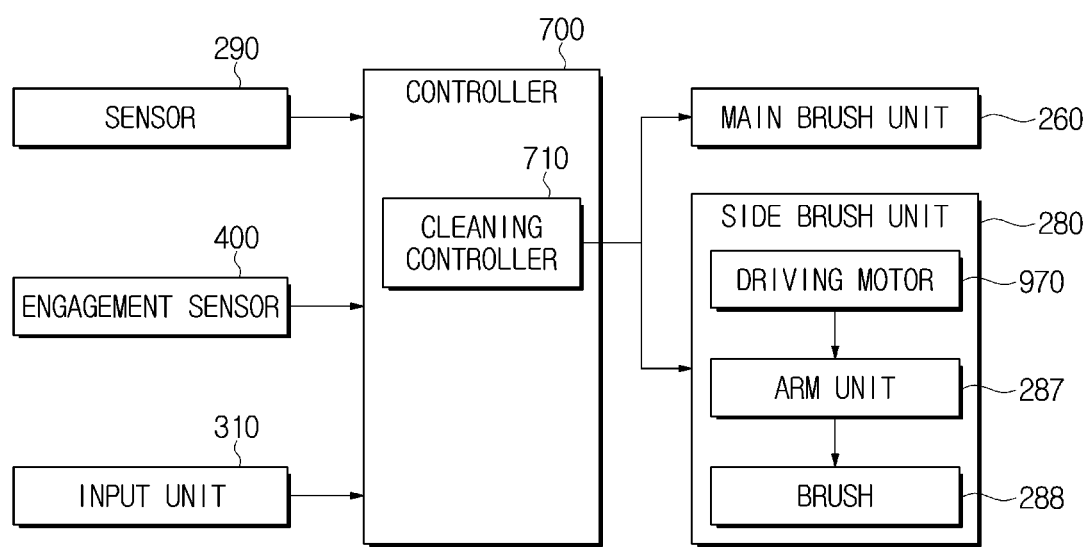
FIG. 9 is a control block diagram showing the manual mode of the cleaning robot in accordance with the first embodiment of the disclosure.

FIG. 9 is a control block diagram showing the manual mode of the cleaning robot in accordance with the first embodiment of the disclosure. Hereinafter, reference numerals not denoted in FIG. 9 will be able to be understood from the above description with reference to FIGS. 1 to 5 and 7.

As shown in FIG. 9, the cleaning robot 1 may include the sensor 290 to sense the obstacle in the cleaning area, the engagement sensor 400 to detect whether the operation unit 320 is coupled to the main body 210, the input unit 310 to receive the command related to the cleaning performance of the cleaning robot 1 from the user, the controller 700 to control cleaning operation of the cleaning robot 1 based on the detection result of the sensor 290 and the engagement sensor 400 or the command input to the input unit 310, the main brush unit 260 and the side brush unit 280 which perform the cleaning operation of the cleaning robot 1, and the driving unit 800 in charge of traveling of the cleaning robot 1.

The detailed description of the sensor 290 has already been described in FIG. 8, and therefore will be omitted.

The engagement sensor 400 may detect whether or not the operation unit 320 is coupled to the main body 210. The engagement sensor 400 may include at least one of the hall sensor and the switch. The detailed description of the engagement sensor 400 has been described in FIGS. 4 and 5, and therefore will be omitted.

The input unit 310 may receive the command related to the cleaning performance of the cleaning robot 1 from the user. Basically, the cleaning start command or the cleaning end command may be inputted through the on/off input, and the command for the cleaning mode may be inputted. The implementation method of the input unit 310 has been described in FIG. 8, and therefore will be omitted.

The cleaning robot 1 may further include the controller 700. The controller 700 may control the entire operation of the cleaning robot 1.

The controller 700 may execute the automatic mode or the manual mode of the cleaning robot 1 based on the detection result of the engagement sensor 400. When the engagement sensor 400 detects that the operation unit 320 is coupled to the main body 210, the controller 700 may execute the manual mode so that the cleaning robot 1 manually travel by the external force applied by the user to clean the cleaning area. When the operation unit 320 is coupled to the main body 210, that is, in the manual mode, the controller 700 may block the power supply to the driving unit so that the main unit 210 is able to be moved using the operation unit 320. In other words, the controller 700 may prevent the driving motor 970 from driving the driving wheels 221 and 222 when the operation unit 320 is coupled to the main body 210, that is, in the manual mode.

The controller 700 may include the cleaning controller 710 to control the cleaning operation. The detailed description of the cleaning controller 710 has been described in FIG. 8, and therefore will be omitted.

The controller 700 may include the traveling controller 720 to control traveling. However, in the manual mode of the cleaning robot 1, the traveling controller 720 may not operate. That is, since the cleaning robot 1 travels on the external force applied by the user in the manual mode, the cleaning robot 1 may be not controlled by the traveling controller 720.

The detailed description of the main brush unit 260 and the side brush unit 280 has already been described in FIG. 8, and therefore will be omitted.

The driving unit 800 may include the driving wheels 221 and 222, the caster 240, and the driving motor 970 which drives the driving wheels 221 and 222, and the caster 240. The driving wheels 221 and 222 may be moved by the external force applied by the user instead of the control signal of the traveling controller 720. Alternatively, the driving wheels 221 and 222 may be inserted into the main body 210 in the manual mode. At this time, the main body 210 may be moved using the caster 240 by the external force applied by the user.

Figure 10:
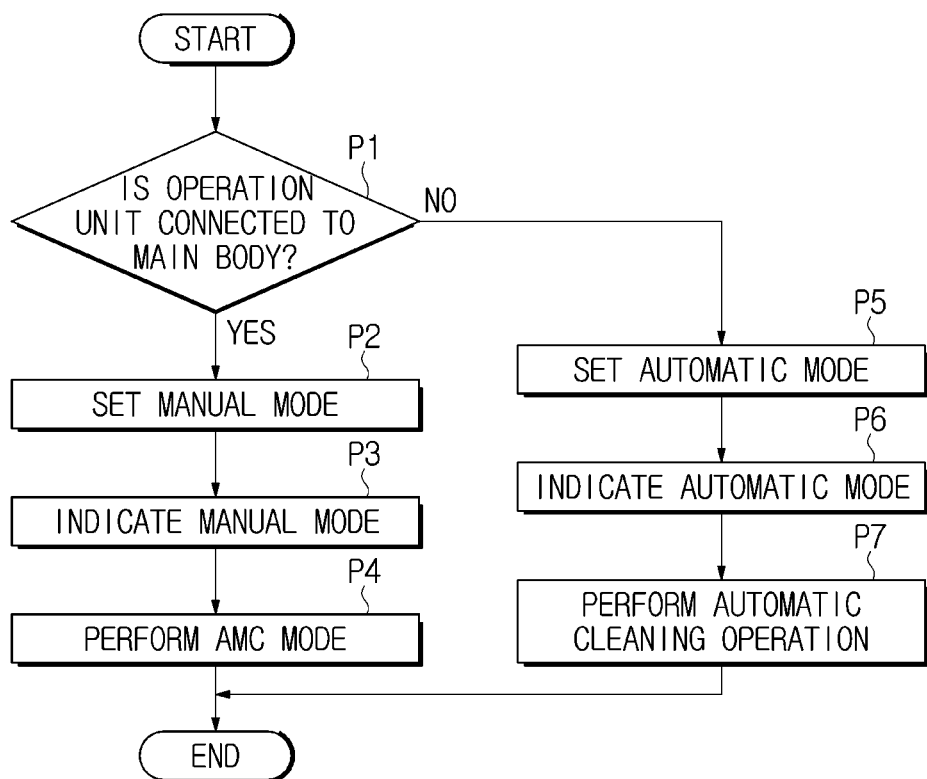
FIG. 10 is a flowchart showing an operation of the cleaning robot having an AMC mode in the cleaning robot in accordance with the first embodiment of the disclosure.

FIG. 10 is a flowchart showing an operation of the cleaning robot having an AMC mode in the cleaning robot in accordance with the first embodiment of the disclosure. Hereinafter, reference numerals not denoted in FIG. 10 will be able to be understood from the above description with reference to FIGS. 1 to 5.

As shown in FIG. 10, the cleaning robot 1 may be set to the automatic mode or the manual mode according to whether or not the operation unit 320 is coupled to the main body 210 (P1). Whether or not the operation unit 320 is coupled to the main body 210 may be detected by the engagement sensor 400. The information detected by the engagement sensor 400 may be transmitted to the controller 700.

When it is detected by the engagement sensor 400 that the operation unit 320 is coupled to the main body 210, the controller 700 may set the manual mode so that the user is able to directly operate the cleaning robot 1 to clean (P2). When the cleaning robot 1 is set to the manual mode, the controller 700 may allow the display unit 300 to display "it is in the manual mode" thereon (P3). The controller 700 may execute the AMC (Advanced Motion Control) mode based on the signal detected by the motion sensor 500 (P4). The user may easily move the main body 210 of the cleaning robot 1 by the AMC mode. In the case of the cleaning robot 1 having high suction power, the volume and weight of the cleaning robot 1 may be increased because a large capacity battery and a high output motor are used. At this time, the user may easily move the main body 210 of the cleaning robot 1 by using the AMC mode.

In order to implement the AMC mode, the cleaning robot 1 may be equipped with the motion sensor 500. The motion sensor 500 may sense the size and direction of the force by which the user operates the operation unit 320. Specifically, the motion sensor 500 may detect the degree and direction to which the user tilts the operation unit 320 with respect to the engagement extension line L. The controller 700 may drive the driving motor 970 connected to the driving wheels 221 and 222 based on the information detected by the motion sensor 500. The driving wheels 221 and 222 may be driven to move the cleaning robot 1 in the tilted direction of the operation unit 320 detected by the motion sensor 500. The driving wheels 221 and 222 may be driven so that the speed at which the cleaning robot 1 moves may be adjusted according to the tilted degree of the operation unit 320 detected by the motion sensor 500.

The cleaning robot 1 may move in a desired direction by the AMC mode. Even if the volume and weight of the cleaning robot 1 are increased by using the large capacity battery and the high output motor, the user may easily move the cleaning robot 1 by operating the operation unit 320 coupled to the cleaning robot 1 in the desired direction.

In other words, in the AMC mode, the method for controlling the cleaning robot 1 may include determining whether the operation unit is coupled to the main body 210 (H1), blocking the power supply to the driving unit when the operation unit 320 is coupled to the main body 210 (H2), detecting the movement of the operation unit 320 coupled to the main body 210 by the at least one motion sensor 500 when the operation unit 320 is coupled to the main body 210 (H3), and supplying the power to the driving unit when the movement of the operation unit 320 is detected (H4). When the direction in which the operation unit 320 is tilted is detected by the at least one motion sensor 500, the traveling direction of the cleaning robot 1 may be determined and the driving unit may be driven. When the tilted degree of the operation unit 320 is detected by the at least one motion sensor 500, the traveling speed of the cleaning robot 1 may be determined and the driving unit may be driven.

When it is not detected by the engagement sensor 400 that the operation unit 320 is coupled to the main body 210, the controller 700 may set the automatic mode so that the cleaning robot 1 is able to automatically clean the cleaning area (P5). When the automatic mode is set, the controller 700 may allow the display unit 300 to display "it is in the automatic mode" thereon (P6). When the automatic mode is displayed on the display unit 300, the cleaning robot 1 may clean while traveling the cleaning area by itself.

Figure 11:
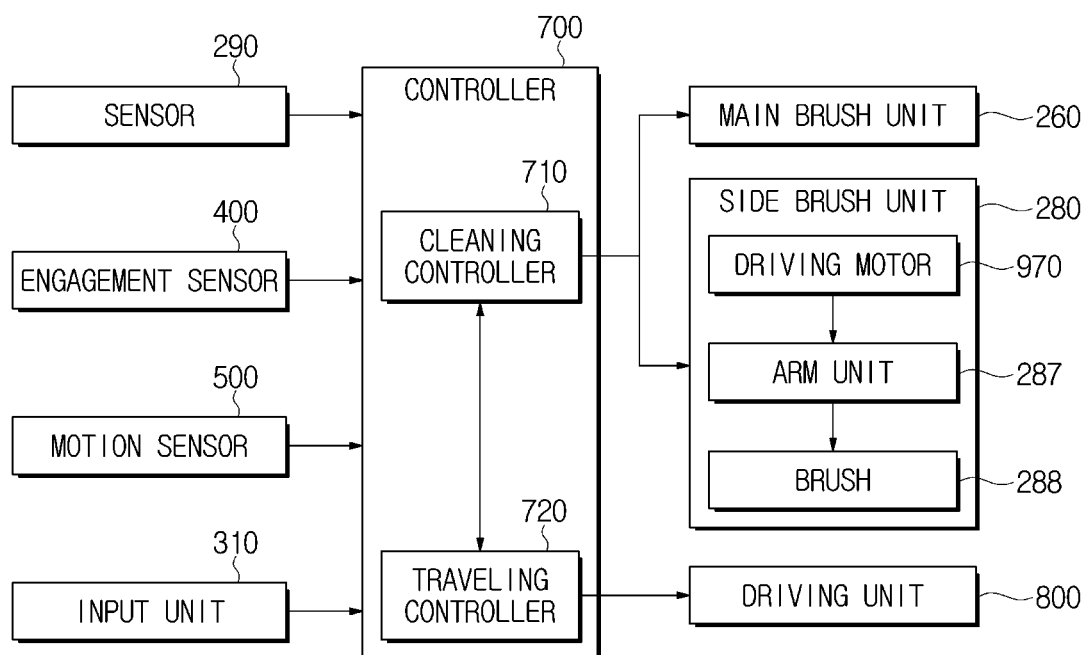
FIG. 11 is a control block diagram showing the AMC mode of the cleaning robot in accordance with the first embodiment of the disclosure.

FIG. 11 is a control block diagram showing the AMC mode of the cleaning robot in accordance with the first embodiment of the disclosure. Hereinafter, reference numerals not denoted in FIG. 11 will be able to be understood from the above description with reference to FIGS. 1 to 5 and 10.

As shown in FIG. 11, the cleaning robot 1 may include the sensor 290 to sense the obstacle in the cleaning area, the engagement sensor 400 to detect whether the operation unit 320 is coupled to the main body 210, the motion sensor 500 to detect the movement of the operation unit 320 coupled to the main body 210, the input unit 310 to receive the command related to the traveling performance or the cleaning performance of the cleaning robot 1 from the user, the controller 700 to control the traveling operation and cleaning operation of the cleaning robot 1 based on the detection result of the sensor 290, the engagement sensor 400 and the motion sensor 500 or the command inputted to the input unit 310, the main brush unit 260 and the side brush unit 280 which perform the cleaning operation of the cleaning robot 1, and the driving unit 800 in charge of traveling of the cleaning robot 1.

The detailed description of the sensor 290 has been described in FIG. 8, and therefore will be omitted.

The engagement sensor 400 may detect whether or not the operation unit 320 is coupled to the main body 210. The engagement sensor 400 may include at least one of the hall sensor and the switch. The detailed description of the engagement sensor 400 has been described in FIGS. 4 and 5, and therefore will be omitted.

The cleaning robot 1 may include the at least one motion sensor 500. The at least one motion sensor 500 may be provided to detect the movement of the operation unit 320 coupled to the main body 210. The motion sensor 500 may include at least one of the pressure sensor, the flex sensor, the encoder sensor and the potentiometer. The detailed description of the motion sensor 500 has been described in FIGS. 4 and 5, and therefore will be omitted.

The description of the input unit 310 has been described in FIG. 8, and therefore will be omitted.

The cleaning robot 1 may further include the controller 700. The controller 700 may control the entire operation of the cleaning robot 1.

The controller 700 may execute the automatic mode or the manual mode of the cleaning robot 1 based on the detection result of the engagement sensor 400. When the engagement sensor 400 detects that the operation unit 320 is not coupled to the main body 210, the controller 700 may execute the automatic mode so that the cleaning robot 1 cleans the cleaning area while traveling by itself. On the other hand, when the engagement sensor 400 detects that the operation unit 320 is coupled to the main body 210, the controller 700 may execute the manual mode so that the cleaning robot 1 may manually clean the cleaning area by the external force applied by the user.

The controller 700 may execute the AMC mode of the cleaning robot 1 based on the detection result of the motion sensor 500. The controller 700 of the cleaning robot 1 having the AMC mode may drive the driving motor 970 of the main body 210 based on the movement of the operation unit 320 detected by the at least one motion sensor 500. Further, the controller 700 may be electrically connected to the motion sensor 500 to easily move the main body 210.

The controller 700 may determine the traveling direction of the cleaning robot 1 based on the tilted direction of the operation unit 320 and determine the traveling speed of the cleaning robot 1 based on the tilted degree of the operation unit 320.

The controller 700 may include the cleaning controller 710 to control the cleaning operation and the traveling controller 720 to control the traveling operation.

The description of the cleaning controller 710 has been described in FIG. 8, and therefore will be omitted.

The traveling controller 720 may control the driving unit 800 based on the detection result of the sensor 290 and the motion sensor 500 or the command of the user inputted through the input unit 310 to control the traveling direction and traveling speed of the cleaning robot 1.

The description of the main brush unit 260 and the side brush unit 280 has been described in FIG. 8, and therefore will be omitted.

The driving unit 800 may include the driving wheels 221 and 222, the caster 240 and the driving motor 970 which drive the driving wheels 221 and 222, and the caster 240. The traveling controller 720 may send the control signal to the driving motor 970 based on the detection result of the motion sensor 500 to drive the driving wheels 221 and 222 forward (F) or rearward (R). Therefore, the cleaning robot 1 may be moved forward (F) or rearward (R).

Figure 12A:
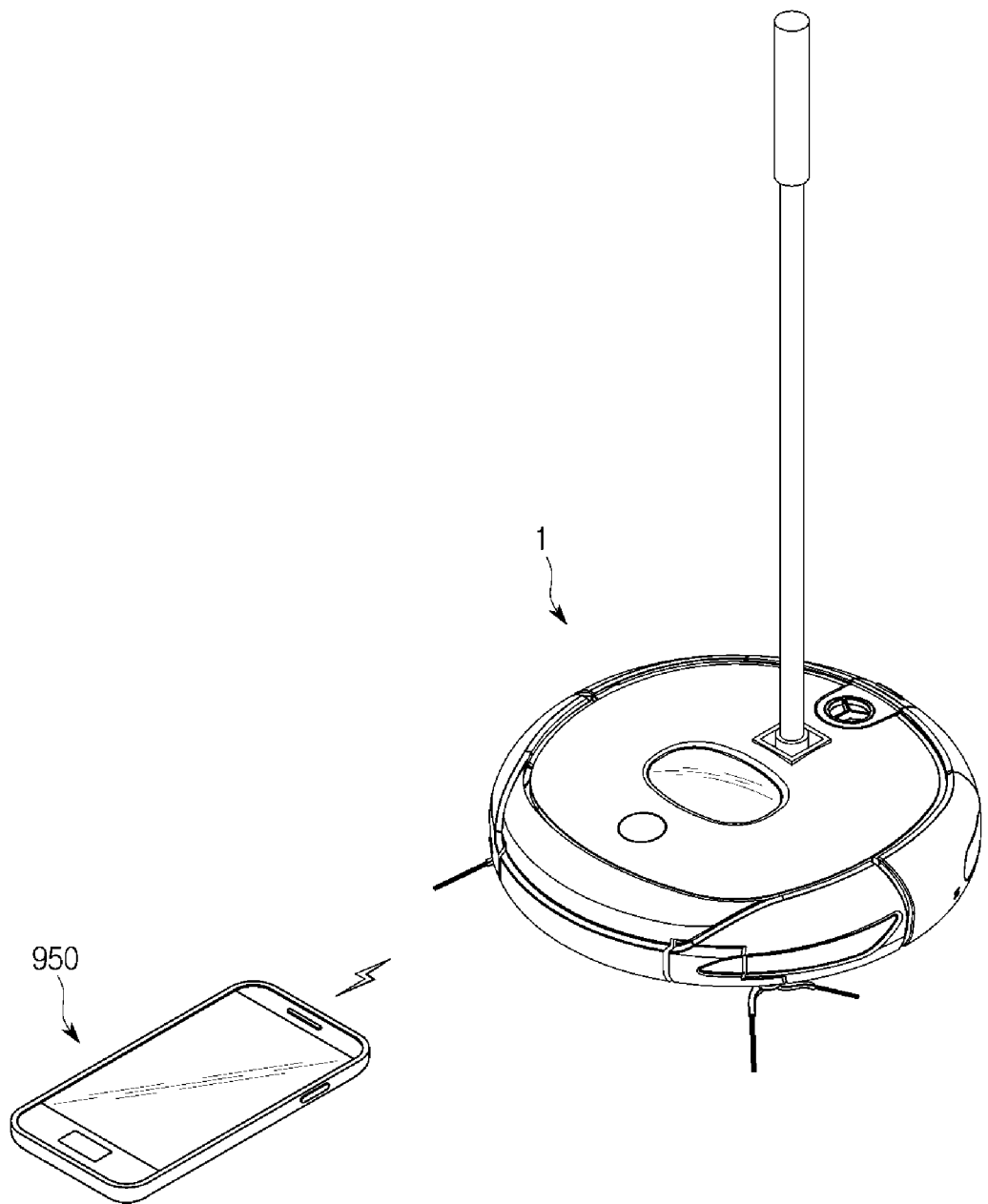
FIGS. 12A to 12C are views showing various ways in which the cleaning robot in accordance with the first embodiment of the disclosure receives commands related to traveling or cleaning operations.
Figure 12B:
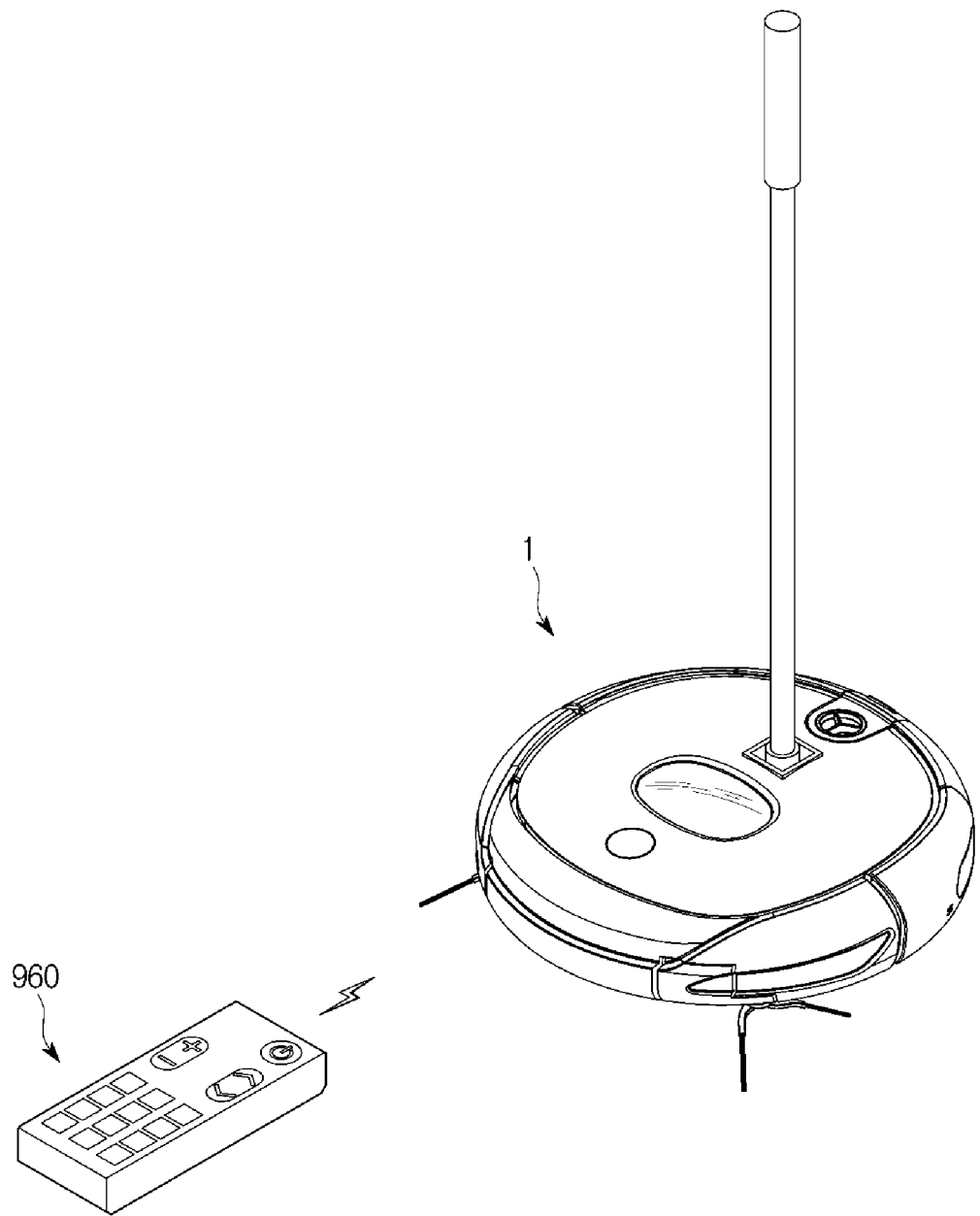
Figure 12C:
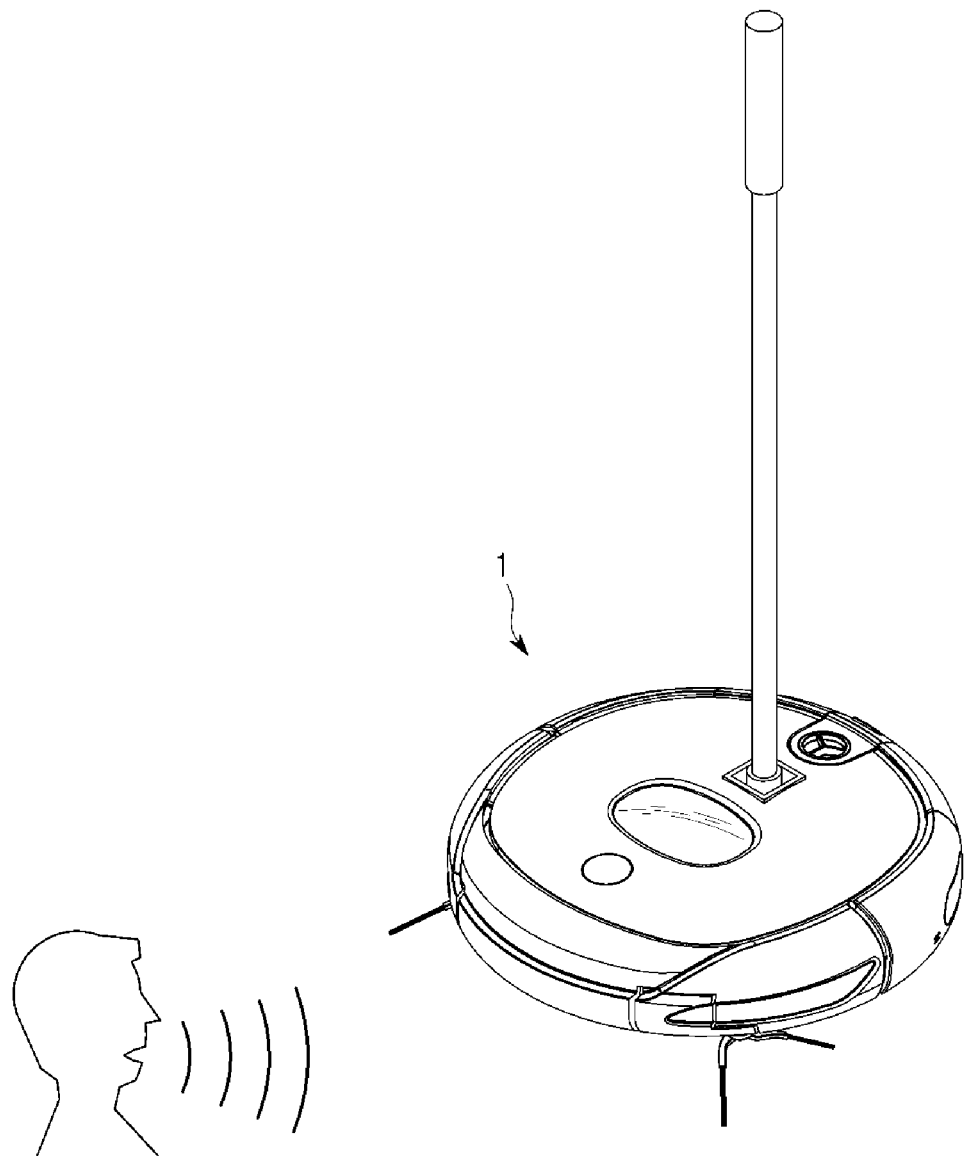

FIGS. 12A to 12C are views showing various ways in which the cleaning robot in accordance with the first embodiment of the disclosure receives commands related to traveling or cleaning operations. FIGS. 12A to 12C show the cleaning robot 1 having the AMC mode.

As shown in FIG. 12A, the cleaning robot 1 performing the AMC mode may receive a command related to the traveling operation or the cleaning operation from a terminal 950 such as a cellular phone.

As shown in FIG. 12B, the cleaning robot 1 performing the AMC mode may receive a command related to the traveling operation or the cleaning operation from a remote controller 960.

As shown in FIG. 12C, the cleaning robot 1 performing the AMC mode may receive a command related to the traveling operation or the cleaning operation through voice recognition.

The manner in which the cleaning robot 1 performing the AMC mode receives a command from the user is not limited to the above examples, and various applications will be possible.

Figure 13A:
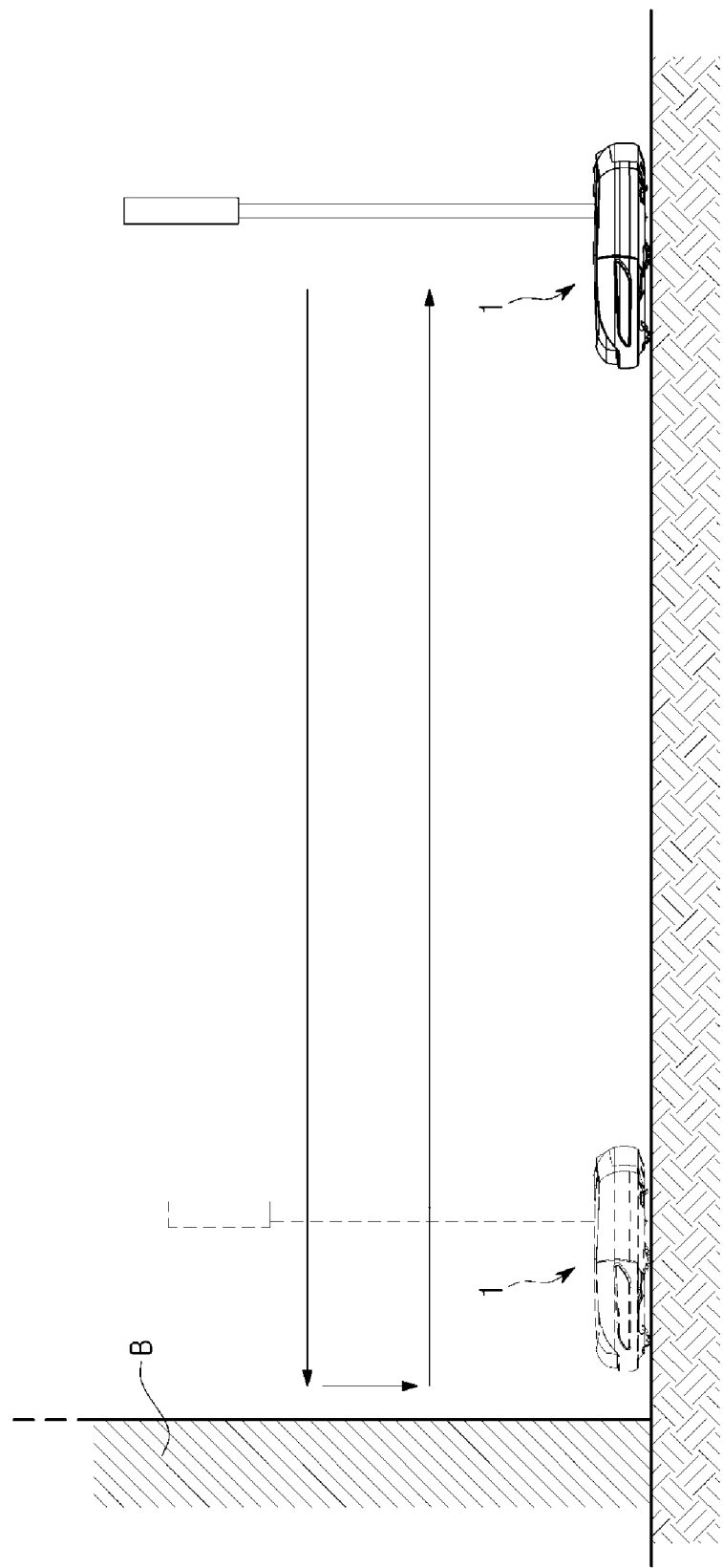
FIGS. 13A and 13B are views showing an operation state in a returning function and a repeating function of the cleaning robot in accordance with the first embodiment of the disclosure.
Figure 13B:
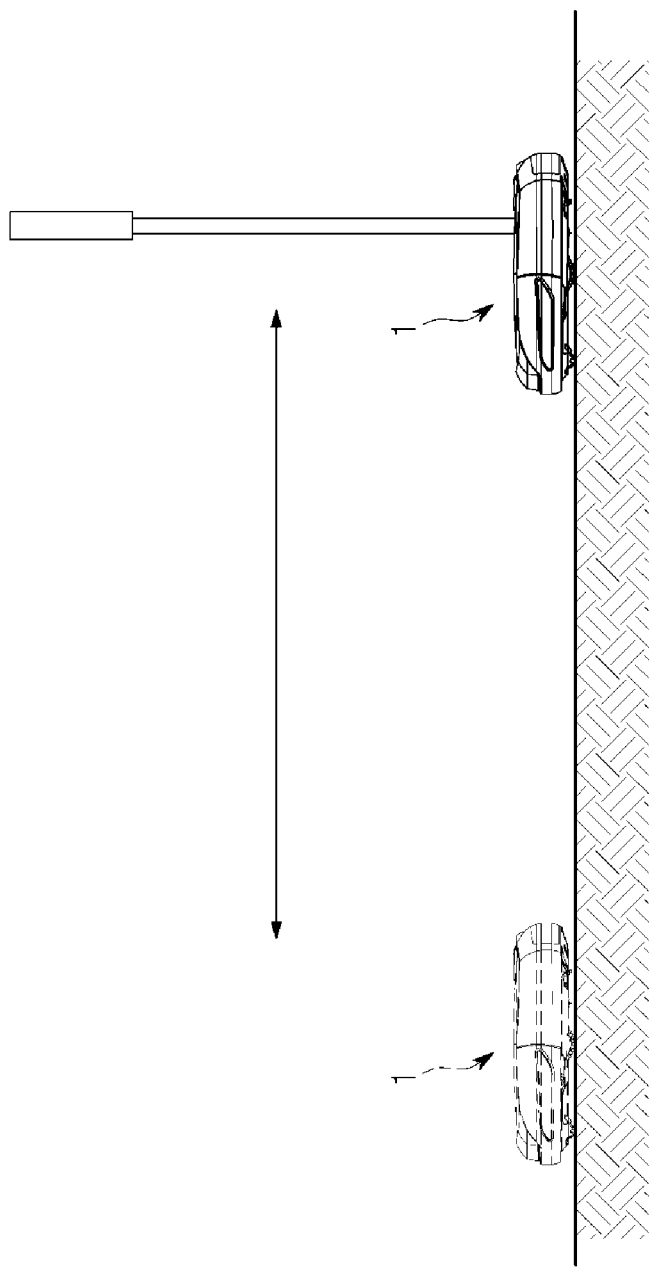
Figure 14A:
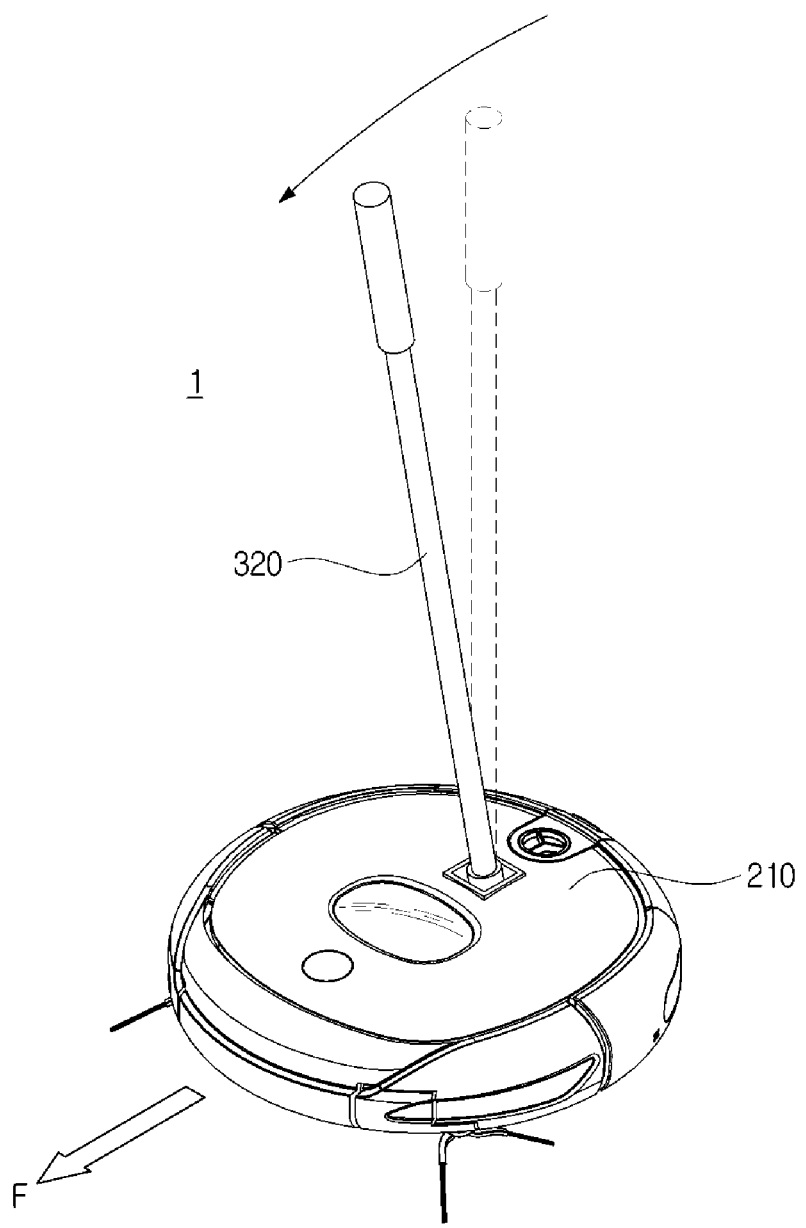
FIGS. 14A and 14B are views showing a way in which the cleaning robot of FIGS. 13A and 13B receives commands regarding the returning function and the repeating function.
Figure 14B:
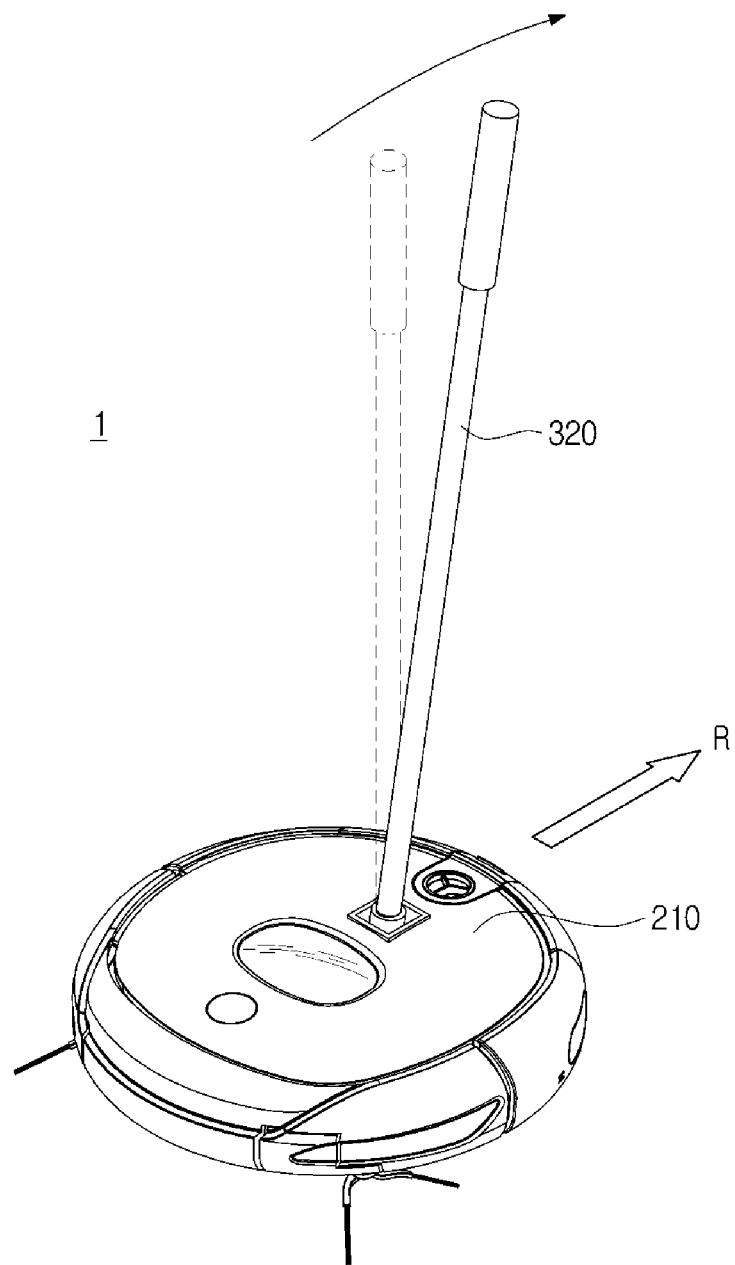

FIGS. 13A and 13B are views showing an operation state in a returning function and a repeating function of the cleaning robot in accordance with the first embodiment of the disclosure, and FIGS. 14A and 14B are views showing a way in which the cleaning robot of FIGS. 13A and 13B receives commands regarding the returning function and the repeating function. FIGS. 13A to 14B show the cleaning robot 1 having the AMC mode.

As shown in FIG. 13A, the cleaning robot 1 performing the AMC mode may have a returning function. When an obstacle B is detected by the sensor 290 in the traveling process of the cleaning robot 1, the cleaning robot 1 may return to a position at which the cleaning robot 1 started traveling. Specifically, when the user inputs a first automatic cleaning command (a returning command) to the cleaning robot 1 having the AMC mode, the controller 700 may control the driving wheels 221 and 222 so that the cleaning robot 1 returns to the position at which the cleaning robot 1 started traveling, in the case of that the sensor 290 detects the obstacle B in the traveling process of the cleaning robot 1. It is also possible to control the driving wheels 221 and 222 so that the cleaning robot 1 returns to a specific position as well as the position at which the cleaning robot 1 starts to travel.

As shown in FIG. 13B, the cleaning robot 1 performing the AMC mode may have a repeating function. Specifically, when the user inputs a second automatic cleaning command (a repeating command) to the cleaning robot 1 having the AMC mode, the controller 700 may control the driving wheels 221 and 222 so that the cleaning robot 1 performs a repetitive cleaning operation to a predetermined section.

The cleaning robot 1 performing the AMC mode may receive the first automatic cleaning command (the returning command) and/or the second automatic cleaning command (the repeating command) according to a specific pattern drawn by the operation unit 320.

FIGS. 14A and 14B are views showing a way in which the cleaning robot of FIGS. 13A and 13B receives commands regarding the returning function and the repeating function.

As shown in FIG. 14A, when the operation unit 320 is bent over a predetermined angle toward the forward direction F of the cleaning robot 1, the cleaning robot 1 may travel toward the forward direction F toward which the operation unit 320 is bent, and the cleaning robot 1 may perform the returning function when the obstacle B is detected.

As shown in FIG. 14B, when the operation unit 320 is bent over a predetermined angle toward the rearward direction R of the cleaning robot 1, the cleaning robot 1 may travel toward the rearward direction R toward which the operation unit 320 is bent, and the cleaning robot 1 may perform the returning function when the obstacle B is detected. That is, a motion of bending the operation unit 320 toward a specific direction of the cleaning robot 1 by a predetermined angle or more may correspond to the first automatic cleaning command (the returning command).

The operation unit 320 may be rotated as an example of a method of inputting the second automatic cleaning command (the repeating command) to the cleaning robot 1. When the operation unit 320 is rotated a specified number of times, the cleaning robot 1 may perform the cleaning operation repeatedly the number of times the operation unit 320 is rotated with respect to a predetermined section. That is, a motion of rotating the operation unit 320 may correspond to the second automatic cleaning command (the returning command).

The manner of inputting the automatic cleaning command to the cleaning robot 1 is not limited to the above examples, and various applications will be possible.

Figure 15:
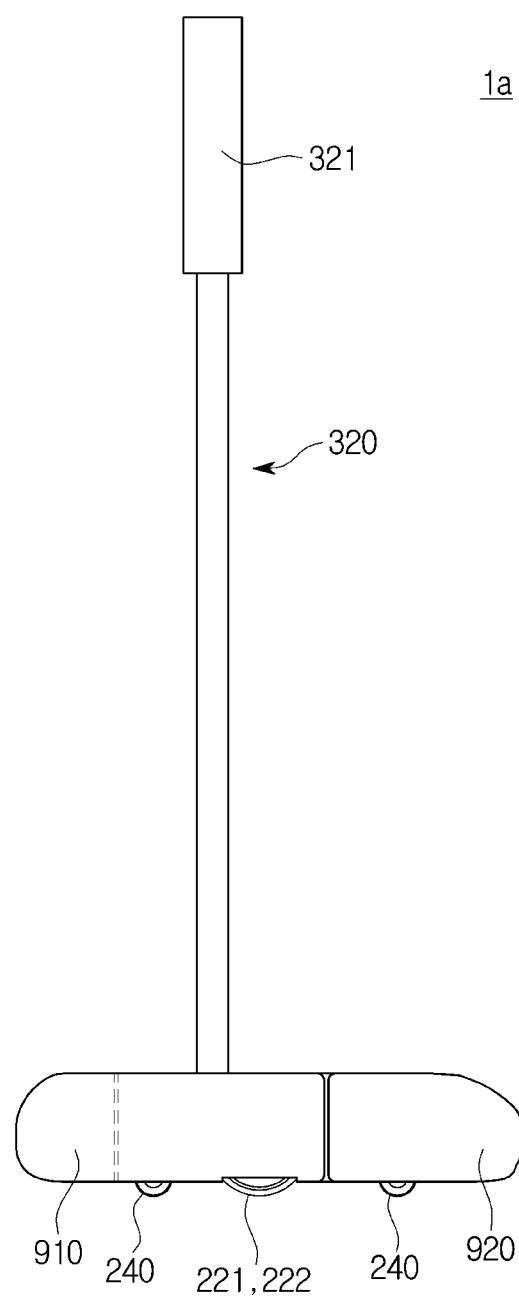
FIG. 15 is a side view schematically illustrating the cleaning robot in accordance with a second embodiment of the disclosure.
Figure 16A:
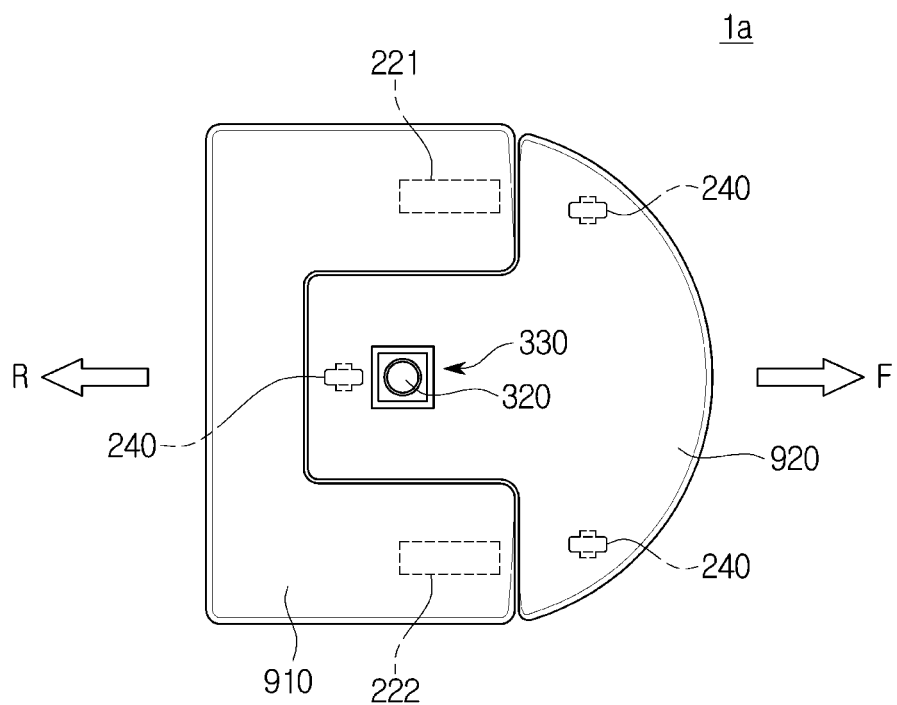
FIGS. 16A and 16B are top views showing the operation state in the manual mode of the cleaning robot in accordance with the second embodiment of the disclosure.
Figure 16B:
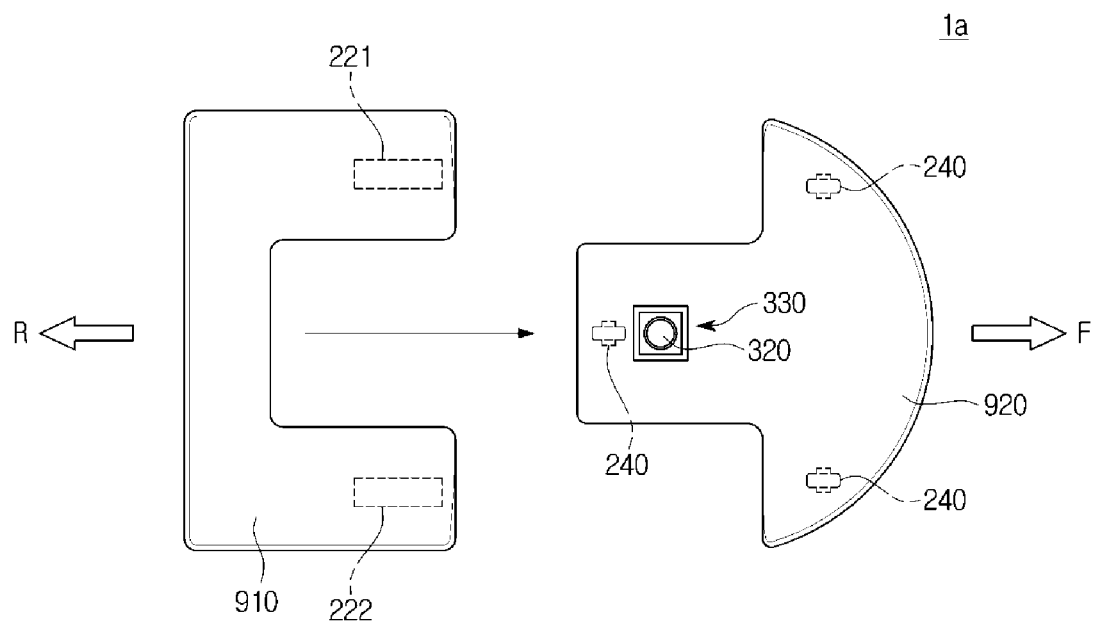

FIG. 15 is a side view schematically illustrating the cleaning robot in accordance with a second embodiment of the disclosure, and FIGS. 16A and 16B are top views showing the operation state in the manual mode of the cleaning robot in accordance with the second embodiment of the disclosure.

As shown in FIGS. 15 to 16B, a cleaning robot 1a may include a main body 910 and a cleaning module 920 that is detachably coupled to the main body 910. The main body 910 and the cleaning module 920 may be detachably coupled to each other by an electrical signal or a physical signal.

The main body 910 and the cleaning module 920 may be coupled to each other to form an entire outer appearance of the cleaning robot 1a.

The cleaning robot 1a may further include a locking device (not shown) to detachably couple the cleaning module 920 to the main body 910. The locking device may be released so that the cleaning module 920 is detached from the main body 910 when the operation unit 320 is coupled to the cleaning module 920.

The cleaning robot 1a may further include the operation unit 320. The operation unit 320 may be mounted or detachably coupled to the cleaning module 920. Further, the operation unit 320 may be provided so as to be gripped.

The cleaning robot 1a may further include the engagement sensor 400 provided to detect whether the operation unit 320 is coupled to the cleaning module 920. The engagement sensor 400 may include at least one of the hall sensor and the switch. It is sufficient that the engagement sensor 400 is capable of detecting whether or not the operation unit 320 is coupled to the cleaning module 920 and a type of the engagement sensor 400 is not limited to at least one of the hall sensor and the switch. The engagement sensor 400 may be installed at a coupling portion of the operation unit 320 and the cleaning module 920.

The cleaning robot 1a may further include driving wheels 221 and 222 to impart mobility to the cleaning robot 1a. The driving wheels 221 and 222 may be provided at the main body 910.

The cleaning robot 1a may further include at least one of an inlet port (not shown) to suck the foreign matter such as dust, a suction device (not shown) to generate a suction force to suck the foreign mater, a dust collecting device to store the foreign matter introduced through the inlet port, and a driving source (not shown) for transmitting a driving force to the driving wheels 221 and 222. At least one of the inlet port, the suction device, the dust collecting device and the driving source may be provided at the cleaning module 920.

In other words, a configuration for performing the traveling function of the cleaning robot 1a may be provided at the main body 910, and a configuration for performing the cleaning function of the cleaning robot 1a may be provided at the cleaning module 920.

The cleaning robot 1a may further include the caster 240 provided so that the cleaning robot 1a travels in a stable posture. The caster 240 may be provided on the bottom surface of the cleaning module 920.

The cleaning robot 1a may further include the controller 700. The controller 700 may execute the manual mode so that the user is able to manually move the cleaning robot 1a when the operation unit 320 is coupled to the cleaning module 920. The controller 700 may release the locking device so that the cleaning module 920 is detached from the main body 910 in the manual mode.

A process of the cleaning robot 1a performing the manual mode or the automatic mode will be described as follows.

The cleaning robot 1a may be set to the manual mode or the automatic mode depending on whether or not the operation unit 320 is coupled to the cleaning module 920 (K1). Whether or not the operation unit 320 is connected to the cleaning module 920 may be detected by the engagement sensor 400. The information detected by the engagement sensor 400 may be transmitted to the controller 700.

When it is detected by the engagement sensor 400 that the operation unit 320 is coupled to the cleaning module 920, the controller 700 may set the manual mode so that the user is able to clean by directly operating the cleaning robot 1a (K2). When the cleaning robot 1a is set to the manual mode, the controller 700 may indicate the manual mode to the display unit (not shown) (K3). When the display unit displays that it is in the manual mode, the cleaning robot 1a may perform the cleaning operation while traveling the cleaning area manually by the external force applied by the user (K4).

When it is not detected that the operation unit 320 is coupled to the cleaning module 920 by the engagement sensor 400, the controller 700 may set the automatic mode so that the cleaning robot 1a is able to automatically clean the cleaning area (K5). When the automatic mode is set, the controller 700 may allow the display unit to display that it is in an automatic mode thereon (K6). When the display unit displays that it is in the automatic mode, the cleaning robot 1a may perform the cleaning operation while traveling the cleaning area by itself (K7).

In other words, in the automatic mode of the cleaning robot 1a, the main body 910 and the cleaning module 920 may be maintained in a state of being coupled by the locking device. The mobility of the cleaning robot 1a in the automatic mode may be realized by the main body 910 and the cleaning ability of the cleaning robot 1a may be realized by the cleaning module 920.

In the manual mode of the cleaning robot 1a, the main body 910 and the cleaning module 920 may be kept separated from each other as the locking device is released. Specifically, when the engagement sensor 400 detects the coupling of the operation unit 320 with respect to the cleaning module 920, the controller 700 may command the locking device to be released. The cleaning module 920 may be detached from the main body 910 and freely operated by the user by an unlocking command of the controller 700. When the cleaning operation by the manual mode is completed, the user may be able to connect the cleaning module 920 to the main body 910. A docking system may be used in the process of coupling the cleaning module 920 to the main body 910. When the main body 910 and the cleaning module 920 are coupled by the locking device, the user may separate the operation unit 320 from the cleaning module 920.

Figure 17A:
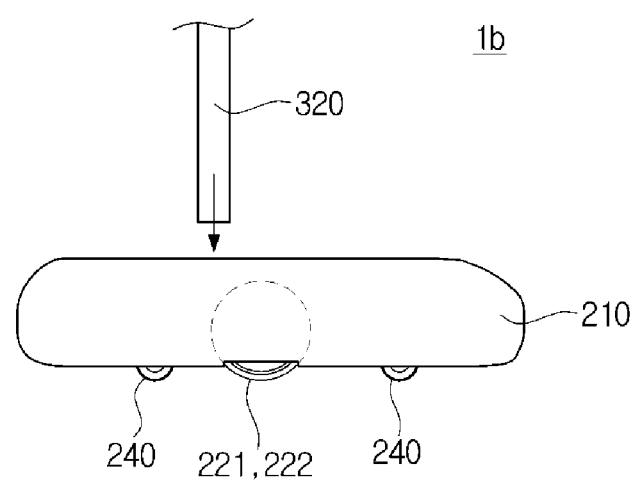
FIG. 17A is a side view showing a case in which the cleaning robot in accordance with a third embodiment of the disclosure is in the automatic mode.
Figure 17B:
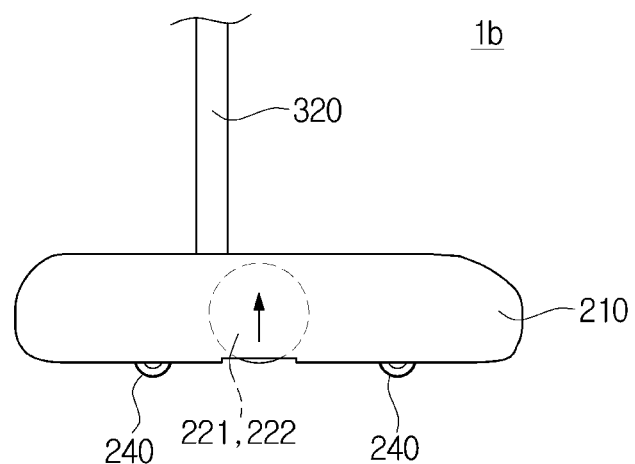
FIG. 17B is a side view showing a case in which the cleaning robot in accordance with the third embodiment of the disclosure is in the manual mode.

FIG. 17A is a side view showing a case in which the cleaning robot in accordance with a third embodiment of the disclosure is in the automatic mode, and FIG. 17B is a side view showing a case in which the cleaning robot in accordance with the third embodiment of the disclosure is in the manual mode. Hereinafter, a description overlapping with the cleaning robot 1 according to the first embodiment will be omitted. Hereinafter, reference numerals not denoted in FIGS. 17A and 17B will be able to be understood from the above description related to the cleaning robot 1 according to the first embodiment.

As shown in FIGS. 17A and 17B, the driving unit of a cleaning robot 1b may include the driving wheels 221 and 222 which are provided to move the main body 210 and to be inserted into the main body 210. As shown in FIG. 17b, the driving wheels 221 and 222 may be inserted into the main body 210 when the operation unit 320 is coupled to the main body 210, that is, in the manual mode. At this time, the main body 210 may be moved by the caster 240. In other words, the main body 210 may be moved using the caster 240 instead of the driving wheels 221 and 222 by the external force applied by the user in the manual mode. In other words, when the operation unit 320 is coupled to the main body 210, that is, in the manual mode, the controller 700 may control the driving wheels 221 and 222 so that the driving wheels 221 and 222 are inserted into the main body 210. As shown in FIG. 17A, the driving wheels 221 and 222 may outwardly protrude from the main body 210 in the automatic mode of the cleaning robot 1b. At this time, the main body 210 may be moved by the driving wheels 221 and 222 which rotate by receiving the driving force from the driving motor.

Figure 18:
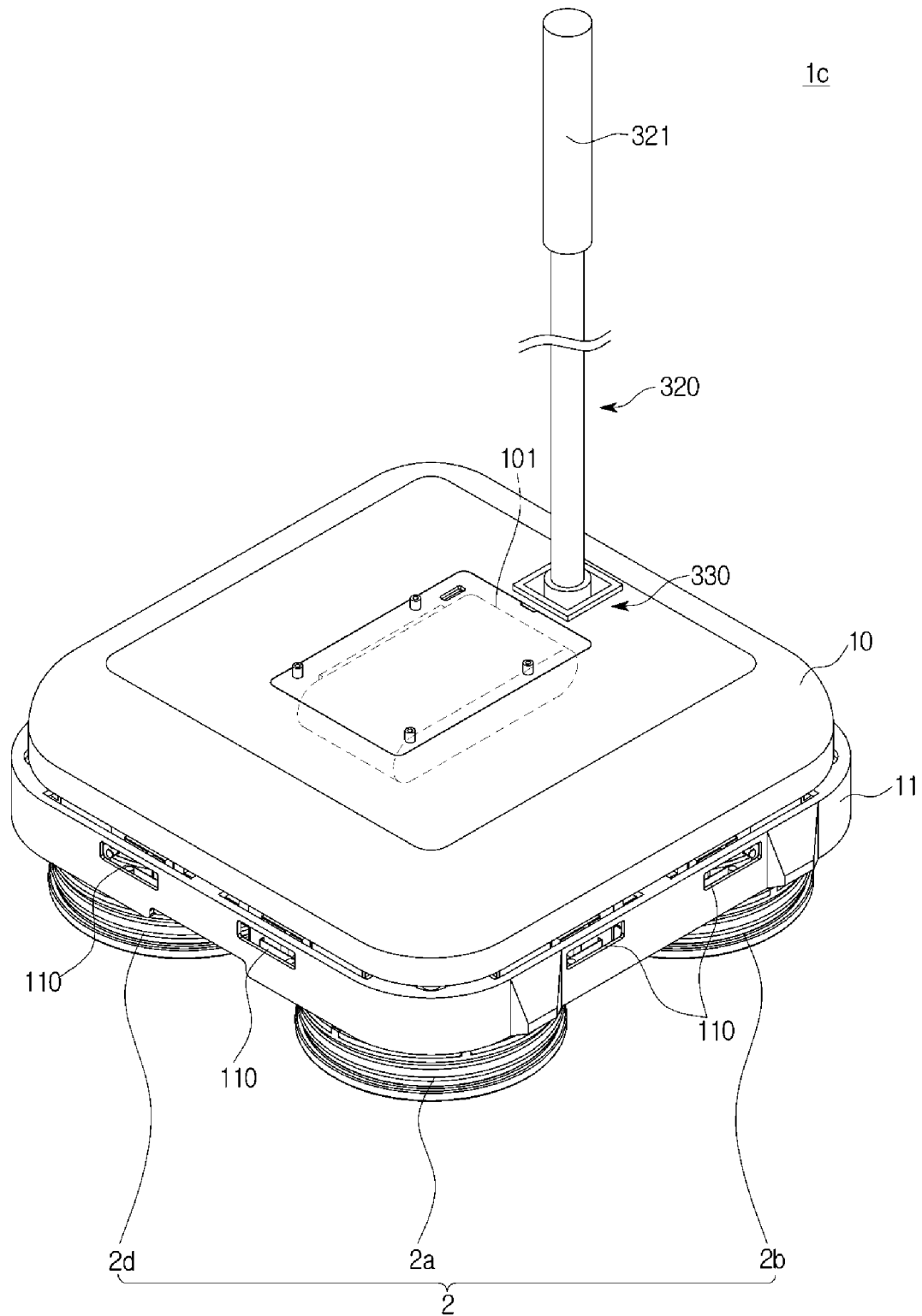
FIG. 18 is a perspective view illustrating the cleaning robot in accordance with a fourth embodiment of the disclosure.
Figure 19:
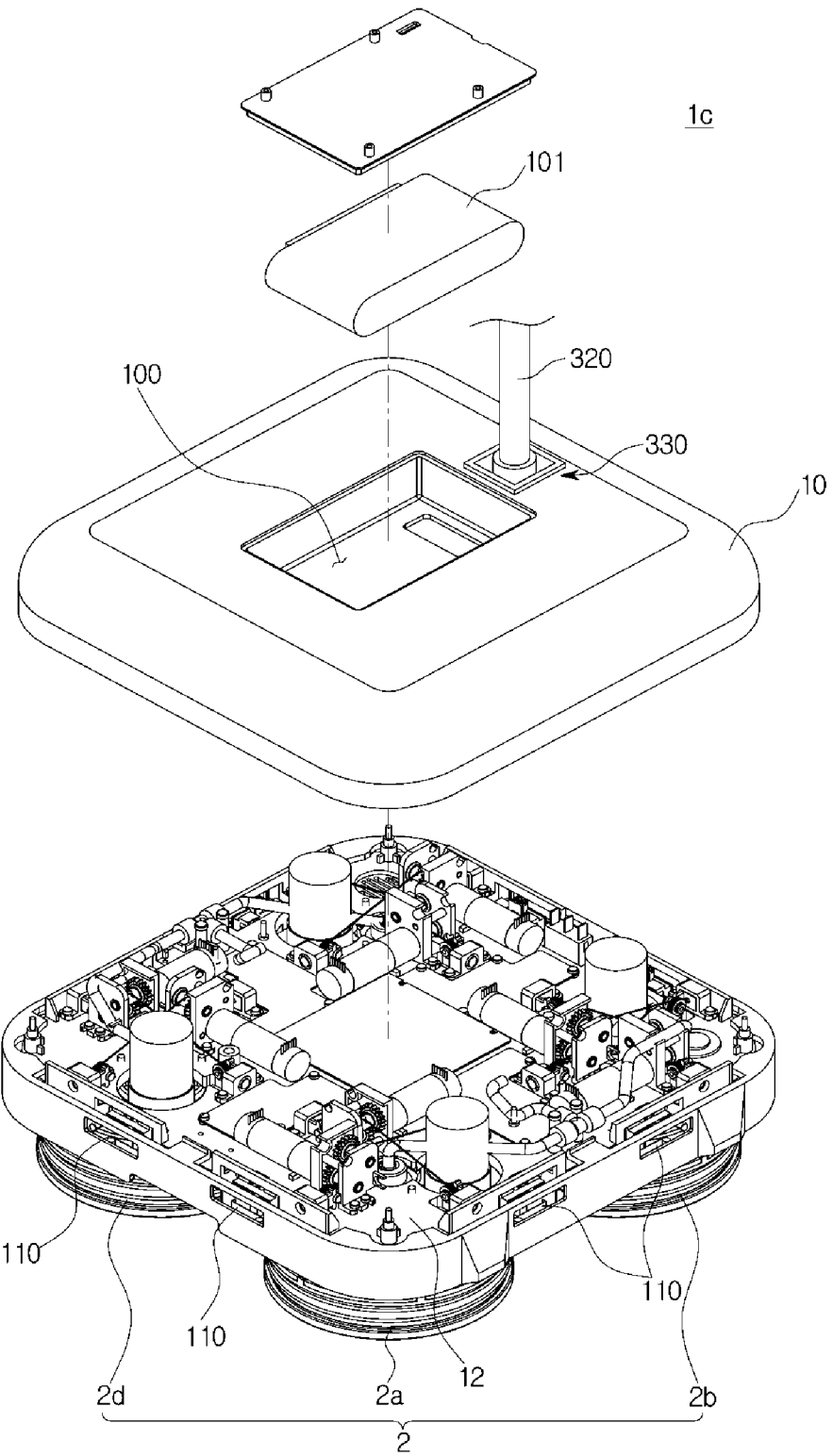
FIG. 19 is a view showing a state in which a cover of the cleaning robot in accordance with the fourth embodiment of the disclosure is detached.
Figure 20:
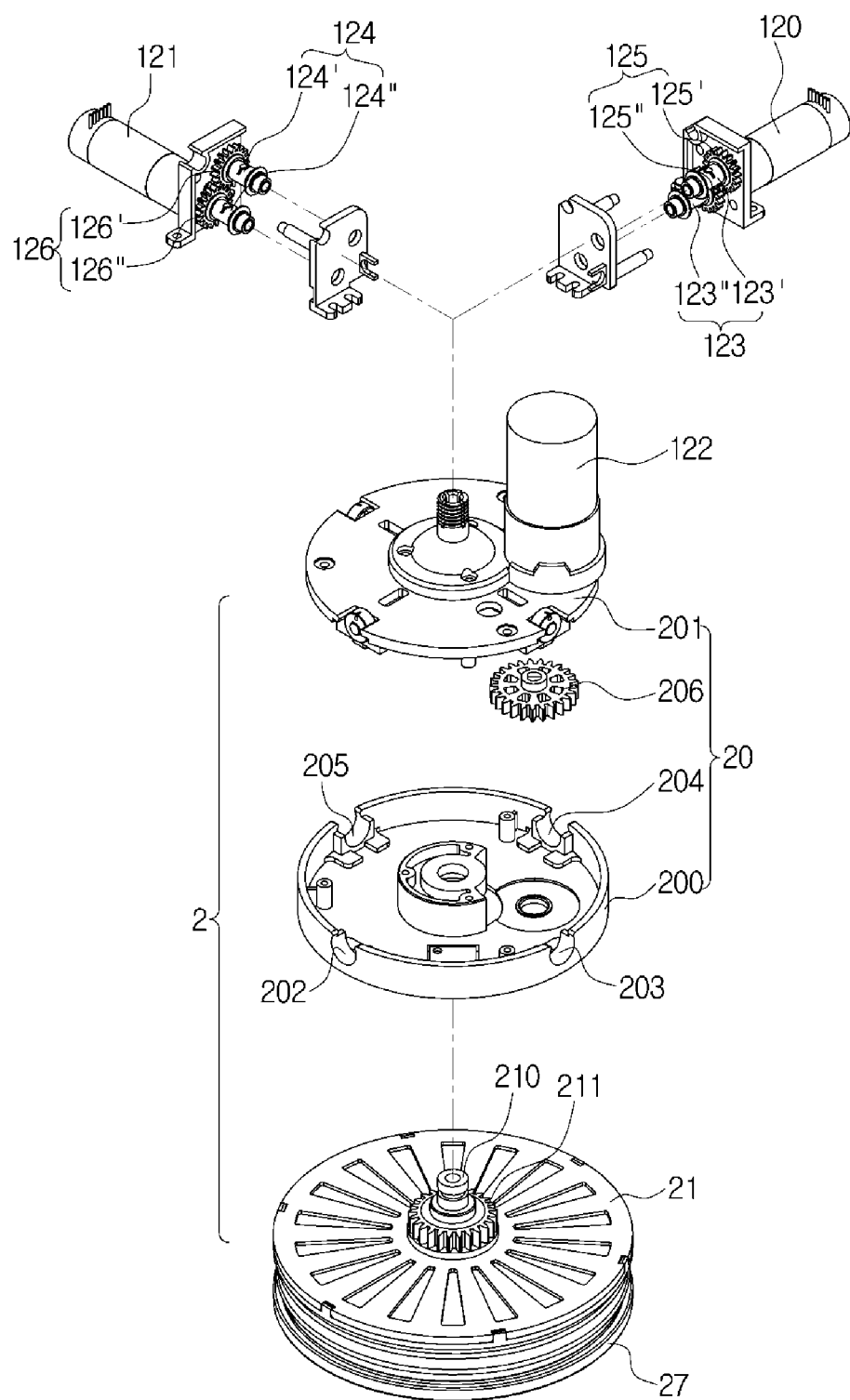
FIG. 20 is an exploded perspective view illustrating a part of the cleaning robot in accordance with the fourth embodiment of the disclosure.
Figure 21:
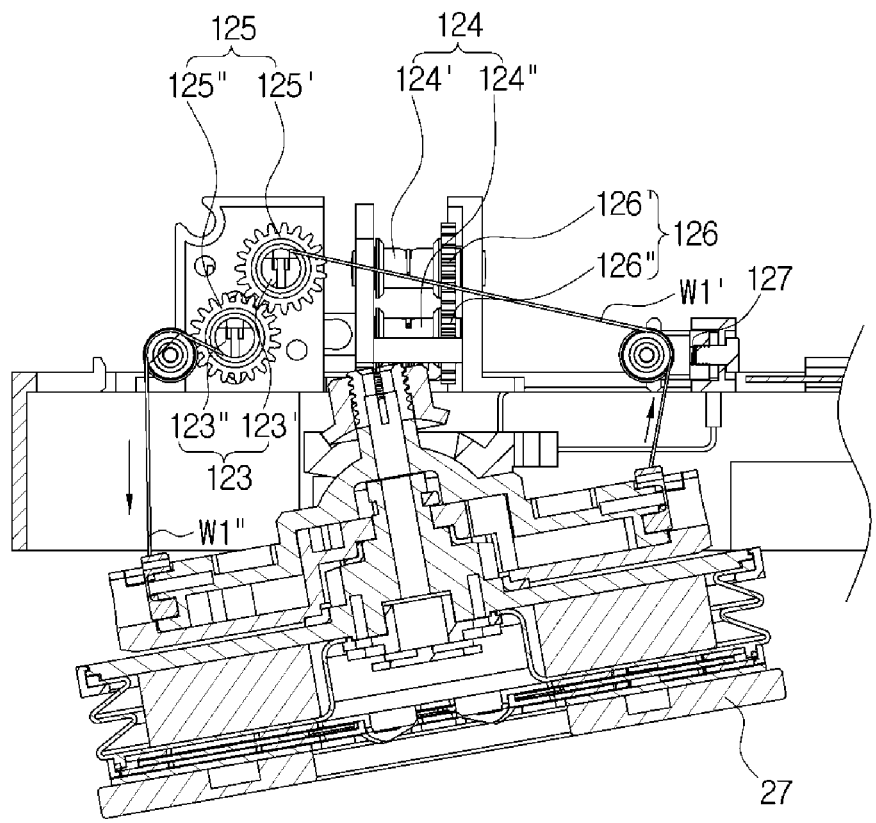
FIG. 21 is an exploded cross-sectional view illustrating a part of the cleaning robot in accordance with the fourth embodiment of the disclosure.

FIG. 18 is a perspective view illustrating the cleaning robot in accordance with a fourth embodiment of the disclosure, and FIG. 19 is a view showing a state in which a cover of the cleaning robot in accordance with the fourth embodiment of the disclosure is detached. FIG. 20 is an exploded perspective view illustrating a part of the cleaning robot in accordance with the fourth embodiment of the disclosure, and FIG. 21 is an exploded cross-sectional view illustrating a part of the cleaning robot in accordance with the fourth embodiment of the disclosure.

As shown in FIGS. 18 to 21, a cleaning robot 1c may include the main body 210 forming an outer appearance and having an inlet port (not shown) provided to suck the foreign matter present in the cleaning area.

The cleaning robot 1c may further include the operation unit 320 coupled to the main body 210 so as to be attached or detached, and provided to be gripped. The operation unit 320 may be provided with the handle 321 for the user to grip.

The cleaning robot 1c may further include the coupling unit 330 provided at the main body 210 so that the operation unit 320 is able to be detachably coupled. The description of the coupling unit 330 has been described in FIGS. 4 and 5, and therefore will be omitted.

The cleaning robot 1c may further include an engagement sensor (not shown) provided so as to detect whether the operation unit 320 is coupled to the main body 210. The description of the engagement sensor has been described in FIGS. 4 and 5, and therefore will be omitted.

The cleaning robot 1c may further include at least one motion sensor (not shown) provided to detect the movement of the operation unit 320 coupled to the main body 210. The description of the at least one motion sensor has been described in FIGS. 4 and 5, and therefore will be omitted.

The cleaning robot 1c may include a controller (not shown) electrically connected to the motion sensor so as to easily move the main body 210 based on the movement of the operation unit 320 detected by the at least one motion sensor. The cleaning robot 1c according to the fourth embodiment may also perform at least one of the automatic mode, the manual mode and the AMC mode, and the method for controlling the cleaning robot 1c according to the fourth embodiment is the same as that of the cleaning robot 1 according to the first embodiment. Therefore, the description of the method for controlling the cleaning robot 1c according to the fourth embodiment will be omitted. The role of the driving unit of the cleaning robot 1 according to the first embodiment, that is, the roles of the driving wheels 221 and 222 of the cleaning robot 1 according to the first embodiment may be performed by a pad assembly 2 of the cleaning robot 1c according to the fourth embodiment.

The cleaning robot 1c may further include a plurality of pad assemblies 2. A pad 27 may be mounted on the bottom surface of the pad assembly 2. The floor may be wet-cleaned by the pad 27. The pad assembly 2 may cleaned the floor by rubbing the floor. The cleaning robot 1c may travel in various directions due to non-uniform frictional force between the pad assembly 2 and the floor.

The upper portion of the cleaning robot 1c may be covered by a cover 10. A water tank accommodating portion 100 may be provided on one side of the cover 10. The water tank accommodating portion 100 may accommodate a water tank 101 for receiving water. The water accommodated in the water tank 101 may be supplied to the pad assembly 2 by a water supply pipe (not shown). The pad assembly 2 may receive water from the water tank 101 and wet-clean the floor surface. A bumper 11 may be provided on a side surface of the cleaning robot 1c. The impact that the cleaning robot 1c receives from the external obstacle may be buffered by the bumper 11.

A sensor 110 (다른 구성의 도면번호와 겹침) may be provided on one side of the bumper 11. The sensor 110 may include an obstruction sensor, a position detection sensor, etc. An obstacle positioned in front F of the cleaning robot 1c may be detected by the sensor 110. The sensor 110 may communicate with a sensor provided in a docking station or a pad replacement device to guide the cleaning robot 1c to the docking station or the pad replacement device.

The pad assembly 2 may be mounted on a base. A plurality of pad assemblies 2 may be provided. Hereinafter, an embodiment in which the pad assembly 2 includes the first pad assembly 2a, the second pad assembly 2b, the third pad assembly 2c, and the fourth pad assembly 2d will be described. Since the first pad assembly 2a, the second pad assembly 2b, the third pad assembly 2c and the fourth pad assembly 2d have the same configuration, the pad assembly 2 will be considered to mean at least one of the first pad assembly 2a, the second pad assembly 2b, the third pad assembly 2c and the fourth pad assembly 2d.

The cleaning robot 1c may further include a motor to drive the pad assembly 2. The motor may include a first motor 120, a second motor 121, and a third motor 122. The first motor 120 and the second motor 121 may be provided on a base 12. The third motor 122 may be mounted to the pad assembly 2. The third motor 122 may allow the pad assembly 2 to rub the floor surface while rotating.

A first shaft 123 may be connected to the first motor 120. The first shaft 123 may be rotated by the first motor 120. A first wire W1 may be connected to the first shaft 123. The first wire W1 may be wound on the first shaft 123 when the first shaft 123 is rotated clockwise or counterclockwise by the first motor 120.

One end and/or the other end of the first wire W1 may be fixed to the pad assembly 2. When the first shaft 123 rotates and the first wire W1 is wound on the first shaft 123, the pad assembly 2 may be tilted by the first wire W1.

For one example, when the first shaft 123 rotates and the first wire W1 is wound on the first shaft 123, the pad assembly 2 may be tilted about the X-axis by the first wire W1. When the pad assembly 2 is tilted and the pad assembly 2 is rotated about the Z-axis by the third motor 122, a non-uniform frictional force may be generated between the floor surface and the bottom surface of the pad assembly 2.

The first shaft 123 may be one. The first wire W1 may be fixed to the first shaft 123. The first shaft 123 may include a first driving shaft 123' and a first connecting shaft 123" that are connected to the first motor 120. The first driving shaft 123' and the first connecting shaft 123" may be connected by a gear 125. The first driving shaft 123' may be provided with a first driving gear 125'. The first connecting shaft 123" may be provided with a first connecting gear 125". The first driving gear 125' and the first connecting gear 125" may be engaged.

When the driving force of the first motor 120 is transmitted to the first driving shaft 123', the first connecting shaft 123" may be rotated together with the first driving shaft 123' by a gear connection. The first driving shaft 123' and the first connecting shaft 123" may rotate in opposite directions. For example, when the first driving shaft 123' rotates clockwise, the first connecting shaft 123" may rotate in a counterclockwise direction.

The first wire W1 may be two. One side of one of the first wires W1' may be fixed to the first driving shaft 123' and the other side of one of the first wires W1' may be fixed to one side of the pad assembly 2. One side of the other one of the first wires W1" may be fixed to the first connecting shaft 123" and the other side of the other one of the first wires W1" may be fixed to the other side of the pad assembly 2. When one of the wire W1' connected to the first driving shaft 123' and the wire W1" connected to the first connecting shaft 123" is wound on the shaft to which they are connected, the other one of the wire W1' and the wire W" may be released from the shaft to which they are connected.

For example, when the first wire W1' connected to the first connecting shaft 123' lifts up one side of the pad assembly 2, the first wire W1" connected to the first connecting shaft 123" may lower the other side of the pad assembly 2 downwardly so that the other bottom surface of the pad assembly 2 is closer to the floor surface. It may allow the pad assembly 2 to be tilted about the X-axis. When the pad assembly 2 is rotated about the Z-axis by the third motor 122, the frictional force between the pad assembly 2 and the floor surface may be unevenly generated.

A second shaft 124 may be connected to the second motor 121. The second shaft 124 may be rotated by the second motor 121. The second wire W2 may be connected to the second shaft 124. The second wire W2 may be wound on the second shaft 124 when the second shaft 124 is rotated clockwise or counterclockwise by the second motor 121. In the pad assembly 2, a straight line passing through the position where the second wire W2 is mounted may be perpendicular to a straight line passing through the position where the first wire W1 is mounted.

One end and/or the other end of the second wire W2 may be fixed to the pad assembly 2. When the second shaft 124 rotates and the second wire W2 is wound on the second shaft 124, the pad assembly 2 may be tilted by the second wire W2.

For one example, when the second shaft 124 rotates and the second wire W2 is wound on the second shaft 124, the pad assembly 2 may be tilted about the Y-axis by the second wire W2. When the pad assembly 2 is tilted, the non-uniform frictional force may be generated between the floor surface and the bottom surface of the pad assembly 2 in the case in which the pad assembly 2 is rotated about the Z-axis by the third motor 122.

The second shaft 124 may be one. The second wire W2 may be fixed to the second shaft 124. Similar to the case of the first shaft 123, the second shaft 124 may include a second driving shaft 124' and a second connecting shaft 124" that are coupled to the second motor 121. The second driving shaft 124' and the second connecting shaft 124" may be connected by a gear 126. The second driving shaft 124' may be provided with a third drive gear 126'. The second connecting shaft 124" may be provided with a fourth connecting gear 126". The third driving gear 126' and the fourth connecting gear 126" may be engaged.

When the driving force of the second motor 121 is transmitted to the second driving shaft 124', the second connecting shaft 124" may be rotated together with the second driving shaft 124' by a gear connection. The second driving shaft 124' and the second connecting shaft 124" may rotate in opposite directions. For example, when the second driving shaft 124' rotates clockwise, the second connecting shaft 124" may rotate in a counterclockwise direction.

The second wire W2 may be two. One side of one of the second wires W2' may be fixed to the second driving shaft 124' and the other side of one of the second wires W2' may be fixed to one side of the pad assembly 2. One side of the other one of the second wires W2" may be fixed to the second connecting shaft 124" and the other side of the other one of the second wires W2" may be fixed to the other side of the pad assembly 2. When one of the wire W2' connected to the second driving shaft 124' and the wire W2" connected to the second connecting shaft 124" is wound on the shaft to which they are connected, the other one of the wire W2' and the wire W2" may be released from the shaft to which they are connected. For example, when the second wire W2' connected to the second connecting shaft 124' lifts up one side of the pad assembly 2, the second wire W2" connected to the second connecting shaft 124" may lower the other side of the pad assembly 2 downwardly so that the other bottom surface of the pad assembly 2 is closer to the floor surface. It may allow the pad assembly 2 to be tilted about the Y-axis. When the pad assembly 2 is rotated about the Z-axis by the third motor 122, frictional force between the pad assembly 2 and the floor surface may be unevenly generated.

The pad assembly 2 may be tilted by the first motor 120 or the second motor 121 and rotated clockwise or counterclockwise by the third motor 122 so that the cleaning robot 1 travels in a specific direction and the floor surface is cleaned by the pad assembly 2.

That is, the first pad assembly 2a, the second pad assembly 2b, the third pad assembly 2c, or the fourth pad assembly 2d may be connected to the first motor or the second motor, respectively. The first pad assembly 2a, the second pad assembly 2b, the third pad assembly 2c or the fourth pad assembly 2d may be tilted about X-axis and Y-axis by the first motor or the second motor. Further, each of the first pad assembly 2a, the second pad assembly 2b, the third pad assembly 2c, or the fourth pad assembly 2d may include a third motor. The first pad assembly 2a, the second pad assembly 2b, the third pad assembly 2c or the fourth pad assembly 2d may be rotated clockwise or counterclockwise by the third motor to rub the floor surface.

The first motor 120 and the second motor 121 for tilting the first pad assembly 2a, the second pad assembly 2b, the third pad assembly 2c or the fourth pad assembly 2d may be provided at the base 12. A third motor 122 for rotating the first pad assembly 2a, the second pad assembly 2b, the third pad assembly 2c or the fourth pad assembly 2d clockwise or counterclockwise about the Z-axis may be mounted on the first pad assembly 2a, the second pad assembly 2b, the third pad assembly 2c and the fourth pad assembly 2d, respectively.

Meanwhile, the first wire W1 and the second wire W2 may be steel wires. The tension of the first wire (W1) may be adjusted by a tension adjusting device 127. For example, the first wire W1 may be provided to be wound on the tension adjusting device 127. The first wire W1 may be wound on the tension adjusting device 127 or the first wire W1 may be unwound from the tension adjusting device 127 so that the tension of the first wire W1, which connects the first shaft 123 and the pad assembly 2, is adjusted to be large or small. The tension adjusting device 127 may be configured so that the first wire W1 is connected so as to extend to the route of the minimum distance between the first shaft 123 and the pad assembly 2. Or the tension adjusting device 127 may be also configured so that the first wire W1 is pulled and connected to bypass the route of the minimum distance between the first shaft 123 and the pad assembly 2.

A tension adjusting device (not shown) may be also connected to the second wire W2 so that the tension of the second wire W2 is adjusted. The tension adjusting device (not shown) connected to the second wire W2 may be configured similarly to the tension adjusting device 127 connected to the first wire W1.

Although a few embodiments of the present disclosure have been shown and described, it would be appreciated by those skilled in the art that changes may be made to the embodiments without departing from the principles and spirit of the invention, the scope of which is defined in the claims and their equivalents.

The invention claimed is:
1. A cleaning robot, comprising:
a main body;
a driving unit including a driving wheel which is provided in the main body to move the main body;
an operation unit coupleable to and decoupleable from the main body, the operation unit being provided to be gripped by a user; and a control unit configured to, while the operation unit is coupled to the main body, block supply of power to the driving unit so that the main body is moveable as the operation unit is moved.

2. The cleaning robot according to claim 1, further comprising:
an engagement sensor provided in the main body to detect whether the operation unit is coupled to the main body.

3. The cleaning robot according to claim 2, further comprising:
a coupling unit provided in the main body so as to allow the operation unit to be accommodated in the coupling unit to thereby be coupled to the main body, the operation unit being removeable from the coupling unit to thereby be decoupled from the main body,
a magnet provided at one end of the operation unit to be coupled to the coupling unit, and
wherein the engagement sensor comprises a hall sensor which recognizes a magnetic field to detect whether the operation unit is coupled to the main body.

4. The cleaning robot according to claim 2, wherein the engagement sensor comprises a switch which recognizes a degree of pressure applied to the operation unit to detect whether the operation unit is coupled to the main body.

5. The cleaning robot according to claim 2, wherein the control unit determines whether the operation unit is coupled to the main body through the engagement sensor.

6. The cleaning robot according to claim 5, further comprising:
a display unit provided on one surface of the main body; to display whether the operation unit is coupled to the main body based on the control unit determining whether the operation unit is coupled to the main body.

7. The cleaning robot according to claim 1, wherein the driving unit comprises a driving motor to be connected to the driving wheel to transmit power to the driving wheel, and
the control unit blocks supply of power to the driving motor while the operation unit is coupled to the main body.

8. The cleaning robot according to claim 1, wherein the main body includes a body in which the driving wheel is provided, and a cleaning module coupleable to and decoupleable from to the body,
the control unit, while the operation unit is coupled to the cleaning module, blocks the supply of power to the driving wheel to move the cleaning module using the control unit.

9. The cleaning robot according to claim 8, wherein the driving unit includes:
a caster provided in the cleaning module, the caster being configured to move the cleaning module using the operation unit while the operation unit is coupled to the cleaning module.

10. The cleaning robot according to claim 1, wherein the driving wheel is provided to be insertable into the main body,
wherein the control unit, while the operation unit is coupled to the main body, controls the driving wheel so that the driving wheel is inserted into the main body.

11. The cleaning robot according to claim 10, wherein the driving unit includes another driving wheel and the driving wheels are disposed to be spaced apart in left and right directions,
the driving unit comprises a caster disposed between the driving wheels along the left and right directions so that the main body moves in a stable manner, and the main body is moved by the caster while the operation unit is coupled to the main body.

12. A method of controlling a cleaning robot, the method comprising:
determining whether an operation unit is coupled to a main body of the cleaning robot, the operation unit being coupleable to and decoupleable from the main body; and
blocking supply of power to a driving unit, which enables the main body to be moveable as the operation unit is moved, while the operation unit is coupled to the main body.

13. The method according to claim 12, further comprising:
determining whether the operation unit is coupled to the main body using an engagement sensor provided in the main body.

14. The method according to claim 13, wherein the driving unit comprises:
a driving wheel provided in the main body to move the main body, and a driving motor to be connected to the driving wheel to transmit power to the driving wheel, and
the method of controlling the cleaning robot further comprises blocking, while the operation unit is coupled to the main body, supply of power to the driving motor.

15. The method according to claim 14, wherein the main body includes a body in which the driving wheel is provided, and a cleaning module coupleable to and decoupleable from the body,
the method of controlling the cleaning robot further comprises, while the operation unit is coupled to the cleaning module, blocking supply of power to the driving wheel to move the cleaning module using the control unit.

16. The method according to claim 15, further comprising:
moving the cleaning module using a caster provided in the cleaning module while the operation unit is coupled to the cleaning module.

17. The method according to claim 12, further comprising:
inserting a driving wheel provided in the main body into the main body while the operation unit is coupled to the main body.

18. The method according to claim 17, wherein the main body is moved by a caster provided in the main body while the operation unit is coupled to the main body.

19. The method according to claim 12, wherein while the operation unit is coupled to the main body, the cleaning robot is operated in a manual mode, and
while the operation unit is decoupled from the main body, the cleaning robot is operated in an automatic mode.

20. A cleaning robot, comprising:
a main body moveable using a driving wheel;
an operation unit coupleable to and decoupleable from the main body, the operation unit being provided to be gripped by a user; and
a control unit configured to:
block supply of power to the driving unit while the operation unit is coupled to the main body to thereby allow the cleaning robot to operate in a manual mode, and
provide the supply of power to the driving unit while the operation unit is decoupled from the main body to thereby allow the cleaning robot to operate in an automatic mode.

* * * * *

UNITED STATES PATENT AND TRADEMARK OFFICE
CERTIFICATE OF CORRECTION

PATENT NO. : 11,737,626 B2
APPLICATION NO. : 17/101430
DATED : August 29, 2023
INVENTOR(S) : Dong Hun Lee et al.

It is certified that error appears in the above-identified patent and that said Letters Patent is hereby corrected as shown below:

In the Claims

Column 25, Line 31:
In Claim 6, delete "body;" and insert --body--.

Signed and Sealed this
Seventeenth Day of October, 2023

Katherine Kelly Vidal
*Director of the United States Patent and Trademark Office*